United States Patent
Ishii

(10) Patent No.: US 10,282,310 B2
(45) Date of Patent: May 7, 2019

(54) ARITHMETIC PROCESSING DEVICE AND CONTROL METHOD THEREOF

(71) Applicant: FUJITSU LIMITED, Kawasaki-shi, Kanagawa (JP)

(72) Inventor: Hiroyuki Ishii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 15/459,033

(22) Filed: Mar. 15, 2017

(65) Prior Publication Data

US 2017/0308483 A1 Oct. 26, 2017

(30) Foreign Application Priority Data

Apr. 26, 2016 (JP) ................................ 2016-087941

(51) Int. Cl.
| | | |
|---|---|---|
| G06F 12/00 | (2006.01) | |
| G06F 12/128 | (2016.01) | |
| G06F 12/0806 | (2016.01) | |
| G06F 12/0811 | (2016.01) | |
| G06F 12/0855 | (2016.01) | |

(52) U.S. Cl.
CPC ........ *G06F 12/128* (2013.01); *G06F 12/0806* (2013.01); *G06F 12/0811* (2013.01); *G06F 12/0855* (2013.01); *G06F 2212/283* (2013.01); *G06F 2212/621* (2013.01)

(58) Field of Classification Search
CPC ............. G06F 12/0806; G06F 12/0811; G06F 12/0855; G06F 12/128; G06F 2212/283; G06F 2212/621
See application file for complete search history.

(56) References Cited

U.S. PATENT DOCUMENTS

| | | | |
|---|---|---|---|
| 7,937,533 B2 * | 5/2011 | Allen, Jr. ............ | G06F 12/0815 711/137 |
| 2006/0036807 A1 | 2/2006 | Watanabe et al. | |
| 2008/0028150 A1 * | 1/2008 | Toussi ................. | G06F 12/0862 711/122 |

FOREIGN PATENT DOCUMENTS

JP 2006-053857 2/2006

\* cited by examiner

*Primary Examiner* — Kalpit Parikh
(74) *Attorney, Agent, or Firm* — Fujitsu Patent Center

(57) ABSTRACT

An arithmetic processing device includes a core, and a first control circuit that controls a memory request issued by the processing core. The first control circuit includes a miss access control unit with input entries that assigns an input entry to the memory request to control a process of the memory request, and a control pipeline circuit that performs a cache hit determination and issues a memory request to the miss access control unit in a case of cache miss. The control pipeline circuit includes a speculative request control unit that issues a speculative memory request to the miss access control unit before the cache hit determination is performed, cancels the issued speculative memory request in a case of cache hit, and more suppresses issuing the speculative memory request when the number of input entries assigned to the canceled speculative memory request increases.

17 Claims, 18 Drawing Sheets

FIG.9

☐ AVAILABLE ENTRY
▨ DETERMINED ENTRY
▩ CANCELED ENTRY
▨ UNDETERMINED ENTRY

S1 INITIAL STATE

MISS ACCESS CONTROL UNIT
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

S2 SPECULATIVE REQUEST IS FLOWING IN PIPE

MISS ACCESS CONTROL UNIT
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

S3 PLURALITY OF REQUESTS ARE FLOWING IN PIPE

MISS ACCESS CONTROL UNIT
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

S4 CACHE MISS IS DETECTED AS RESULT OF REFERENCE TO TAG COPY AND REQUEST IS DETERMINED

MISS ACCESS CONTROL UNIT
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

FIG.10

S5  SPECULATION IS CONTINUED UNTIL ALL ENTRIES ARE USED

☐ AVAILABLE ENTRY
▦ DETERMINED ENTRY
▩ CANCELED ENTRY
▨ UNDETERMINED ENTRY

ARITHMETIC PROCESSING DEVICE AND CONTROL METHOD THEREOF

CROSS-REFERENCE TO RELATED APPLICATION

This application is based upon and claims the benefit of priority of the prior Japanese Patent Application No. 2016-087941, filed on Apr. 26, 2016, the entire contents of which are incorporated herein by reference.

FIELD

The present invention relates to an arithmetic processing device and a control method thereof.

BACKGROUND

An arithmetic processing unit or device (a CPU (Central Processing Unit) chip or a microprocessor, hereinafter simply referred to as a processor) includes caches at a plurality of levels in order to improve memory access performance. The processor includes a plurality of processing units, cores, or circuits (CPU cores, hereinafter referred to as cores), and the core occupies and uses a cache at a first level (L1 cache) as a private cache. Further, the processor includes an upper level cache shared by a plurality of the cores.

In addition, the processor includes, among the caches, a plurality of or a single cache at a level closest to a main memory (last level cache: LLC, hereinafter referred to as an LLC), and there are cases where the processor further includes, outside the LLC, coherency control units or circuits for maintaining coherency between the caches.

Each of the LLC and the coherency control unit includes a control pipeline circuit to which a request is entered, and a request process unit or circuit unit that executes a process corresponding to the request. The request process unit or circuit unit includes a miss access control unit that processes access to a memory in the case where the inputted (entered) request results in cache miss.

On the other hand, the control pipeline circuit performs a tag determination on whether or not the address of the inputted request results in cache hit, a determination on whether or not the address of the inputted request conflicts with the address of a request that is being processed, a determination regarding content of the process for the request, and a resource determination on whether or not it is possible to acquire circuit resources of the process circuit unit, and requests the miss access control unit to perform a memory request process for an appropriate request. Consequently, the request for the memory request to the miss access control unit for the appropriate request is performed after the determination processes in the control pipeline circuit, and hence there are cases where the start of the process of the memory request is delayed, and latency is increased.

To cope with this, when a request is inputted to the control pipeline circuit, it is conceivable to reduce the latency by performing a speculative memory request for the request, before the tag determination. The speculative memory request is disclosed in Japanese Laid-open Patent Publication No. 2006-53857.

SUMMARY

However, when the speculative memory request is issued, the speculative memory request fails in the case where the tag determination indicates the cache hit, and an entry in the miss access control unit is consumed uselessly. Accordingly, in the case where the speculative memory request is issued successively, the entry in the miss access control unit is used effectively when the cache miss occurs frequently. On the other hand, when the cache hit occurs frequently, many entries are consumed uselessly by the failed speculative requests.

One aspect of an embodiment is an arithmetic processing device comprising: a processing core; and a first control circuit that performs control of a memory request to a memory issued by the processing core, wherein the first control circuit includes a miss access control unit that includes a plurality of request entries, and assigns an request entry to the memory request to control a process related to the memory request, and a control pipeline circuit that performs a cache hit determination on whether or not an inputted memory request results in cache hit, and issues a usual memory request to the miss access control unit for the inputted memory request in a case where the cache hit determination indicates cache miss, and the control pipeline circuit includes a speculative request control unit that issues a speculative memory request to the miss access control unit for the inputted memory request before the cache hit determination is performed, cancels the issued speculative memory request in a case where the cache hit determination indicates the cache hit, and more suppresses the issue of the speculative memory request in accordance with an increase in the number of request entries assigned to the canceled speculative memory request.

According to the one aspect, the issue of the speculative memory request is appropriately controlled, and the use efficiency of the entry in the miss access control unit is improved.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a view illustrating the transition of the entry use state in the case where the speculative request and the speculative access do not fail because of the tag miss.

FIG. 10 is a view illustrating the transition of the entry use state in the case where the speculative request and the speculative access do not fail because of the tag miss.

DESCRIPTION OF EMBODIMENTS

Figure 1:
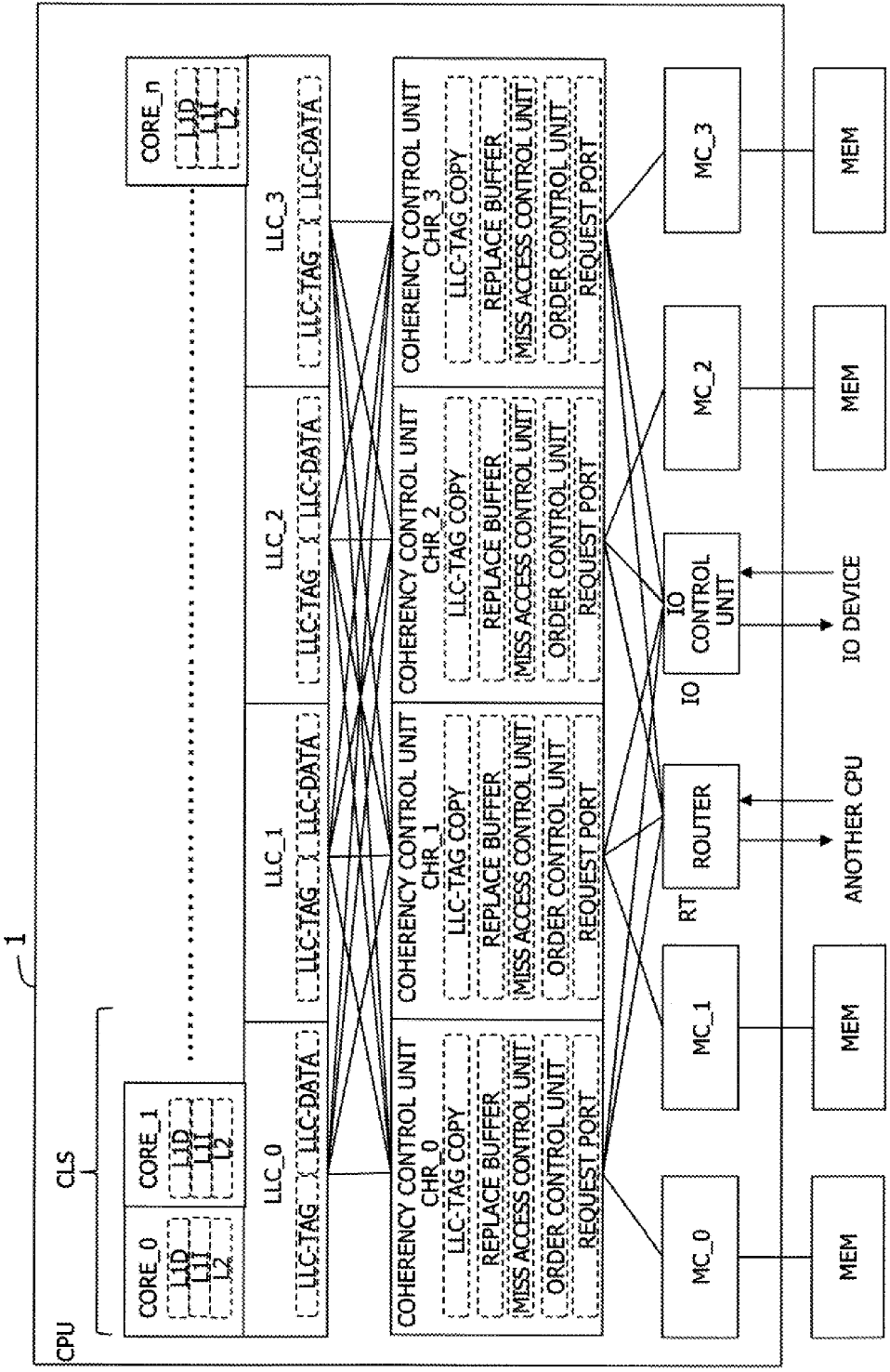
FIG. 1 is a view illustrating an example of the configuration of a processor (CPU chip) in the present embodiment.

FIG. 1 is a view illustrating an example of the configuration of a processor (CPU chip) in the present embodiment. A processor 1 includes CPU cores (cores) CORE_0 to CORE_n each having an instruction control unit (not illustrated) that decodes an instruction and issues arithmetic processing, a processing circuit (not illustrated), a first level (L1) data cache L1D, an L1 instruction cache L1I, and a second level (L2) cache.

Further, in the processor 1, a plurality of the cores CORE_0 to CORE_n are divided into a plurality of groups (or clusters CLS), and the processor 1 has a plurality of last level caches (LLC) LLC_0 to LLC_3 that are provided so as to correspond to the individual groups. Each LLC is shared by a plurality of the cores in each group. Similarly to a usual cache, each LLC includes a tag memory and a data memory, and tag data related to a cache line of the data memory of the LLC (a valid bit, an address, a state, and the like) is stored in the tag memory.

In addition, the processor 1 includes coherency control units or circuits CHR_0 to CHR_3 that perform control for maintaining coherency between a plurality of the LLCs, and memory controllers MC_0 to MC_3 that control access to memories MEM.

As will be described later in detail, each coherency control unit includes a copy of a tag of the LLC, request ports that receive memory requests from each LLC, another CPU, and an IO device, and process circuit units, such as a miss access control unit, an order control unit, and a replace buffer, that execute various processes for maintaining cache coherency to each request.

Four memories MEM_0 to MEM_3 are address-interleaved. For example, in the case where the physical address of all memories is PA[k−1:0], which is a kbit address, the physical addresses of the four memories are as follows:
MEM_0 has PA[m:n]=00
MEM_1 has PA[m:n]=01
MEM_2 has PA[m:n]=10
MEM_3 has PA[m:n]=11

Herein, m and n are natural numbers less than k and more than 0 (0<n<m<k).

Each of the coherency control units CHR_0 to CHR_3 has the copy of the LLC tag. The LLC tag copy of each coherency control unit stores the tag data of the cache line of the LLC corresponding to the physical address of each of the four memories MEM_0 to MEM_3 in correspondence to the above address-interleaving.

Each of the four LLCs is connected to the four coherency control units CHR_0 to CHR_3, and each LLC issues, to the coherency control unit corresponding to the address of the memory request, the memory request that requests memory access in the case where cache miss has occurred. Conversely, each coherency control unit issues a request for a process that is needed for the inputted memory request, as an order, to the four LLCs in a lower level direction opposite to the memory side.

In addition, each of the four coherency control units CHR issues a request for the memory access and a request for write back of data of the cache to the memory to a memory controller MC that is positioned in an upper level direction on the same side as the memory side and corresponds to each coherency control unit.

Further, the processor 1 includes a router RT for communication with another CPU and an IO control unit IO for communication with an IO device.

Figure 2:
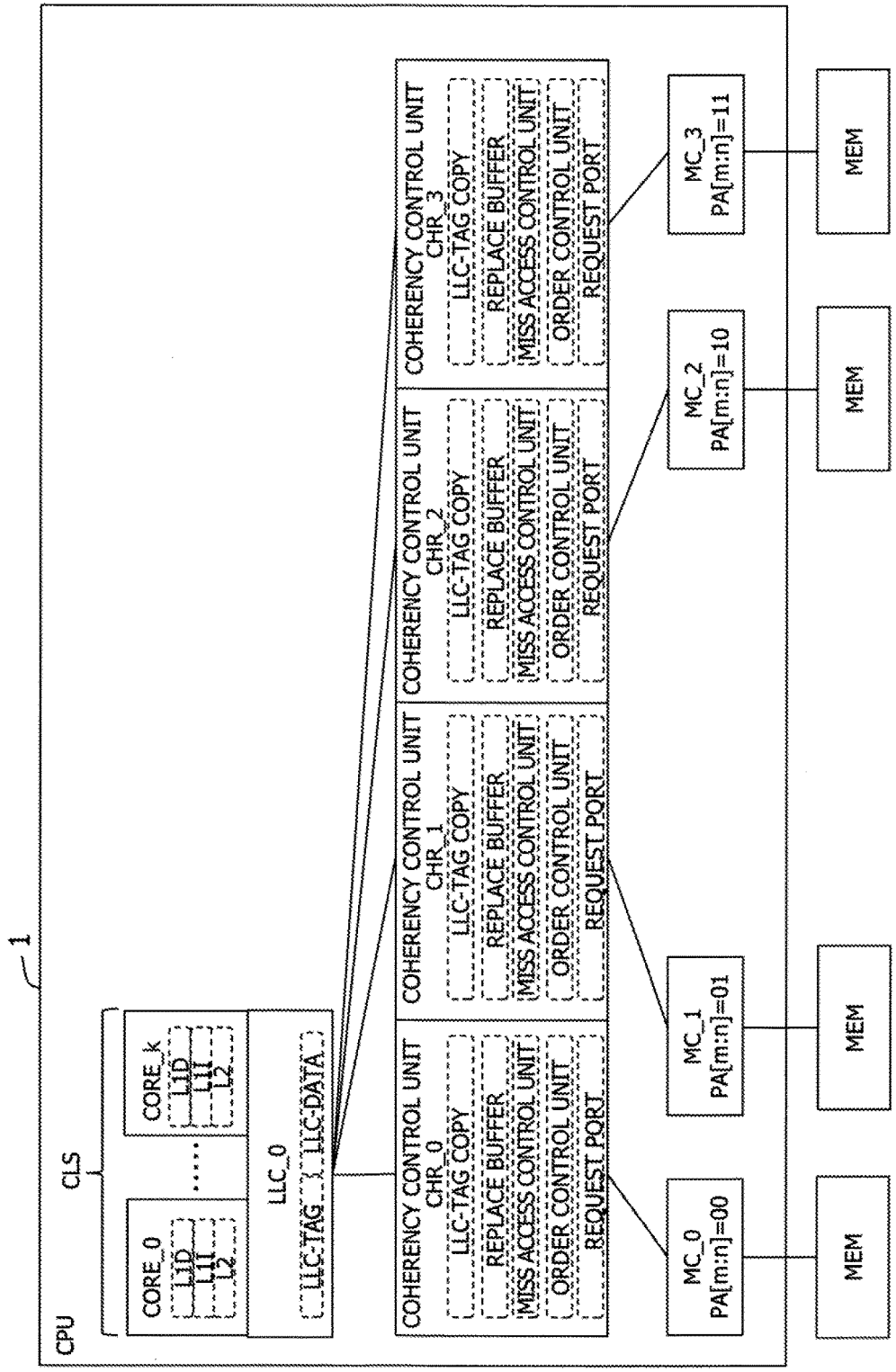
FIG. 2 is a view in which only one cluster in the processor and its corresponding configuration are extracted and illustrated.

FIG. 2 is a view in which only one cluster in the processor and its corresponding configuration are extracted and illustrated. A plurality of the cores CORE_0 to CORE_n in FIG. 1 are divided into four clusters (core groups) CLS. Consequently, in FIG. 1, four LLCs (LLC_0 to LLC_3) are provided in correspondence to four clusters.

On the other hand, one cluster CLS illustrated in FIG. 2 has a plurality of cores CORE_0 to CORE_k. The plurality of cores of the cluster CLS share one LLC (LLC_0). Note that one cluster CLS can perform memory access to all of the four memories MEM_0 to MEM_3 and register read data in the shared LLC (LLC_0).

As described in FIG. 1, the four coherency control units CHR_0 to CHR_3 correspond and are connected to the four address-interleaved memories MEM_0 to MEM_3 via the corresponding four memory controllers MC_0 to MC_3. Consequently, one LLC (LLC_0) can issue the memory request to all of the coherency control units CHR_0 to CHR_3, and issues the memory request to the coherency control unit corresponding to the address of the memory request.

In FIGS. 1 and 2, an example of the operation of the processor 1 will be briefly described. When any of the cores executes a load instruction to read data in the memory MEM and the cache miss occurs in the L2 cache in the core, the L2 cache issues the memory request to read data in the memory to the LLC in response to the cache miss. Further, when the LLC causes the cache miss for the memory request, the LLC issues the memory request to the coherency control unit CHR corresponding to the address of the request.

The coherency control unit searches the LLC tag copy to check whether or not the remaining LLCs retain the data of the address. When cache hit is detected, the coherency control unit issues an order to the LLC that retains the data such that the LLC transfers the retained data to the LLC serving as a requester of the memory request. On the other hand, when the cache miss is detected, the coherency control unit issues the memory request to request access to the memory to the memory controller MC. Subsequently, when a data response is sent from the memory, the coherency control unit sends the data response to the LLC serving as the requester of the memory request.

Further, in the case where the core has executed the above-described load instruction or the core has executed a store instruction, leading to write to the cache has occurred, the coherency control unit issues a request for various processes based on the MESI (Modified, Exclusive, Shared and Invalid) protocol to the memory controller MC at an upper level as a request, and to the LLC at a lower level as an order. Both of the request and the order are requests for a given process, and they are referred to as the request or the order depending on the request destination of the process. In addition, the upper level means a direction toward a memory layer, and the lower level means a direction toward the lower level cache or the core.

Requests to Addresses

Each of the L2 cache, the LLC, and the coherency control unit CHR receives a request to an address in a memory space, and controls the execution of the process corresponding to each request. Herein, the address in the memory space includes (1) a cacheable address that is the address of the main memory MEM illustrated in FIGS. 1 and 2, and (2) a non-cacheable (caching-impossible) address of a memory such as a system boot ROM or SRAM or a register of a peripheral device. Note that there are cases where the non-cacheable address includes part of addresses in the main memory MEM.

Consequently, the request (read or write) to the address in the memory space includes (1) the request to the cacheable address described above, and (2) the request to the non-cacheable address. The request to the cacheable address includes (1-1) the request issued due to the cache miss in the cache such as the L2 cache or the LCC in the CPU (local CPU), i.e., the request issued due to the cache miss at the level lower than that of the coherency control unit, and (1-2) the request issued by the IO device (e.g., a dynamic memory access (DMA)) or another CPU (remote CPU).

Coherency Control Unit

The present embodiment can be applied to each of a speculative request in the coherency control unit and the speculative request in the cache such as the LLC. Accordingly, in the following description, the speculative request will be described by taking the coherency control unit as an example.

Figure 3:
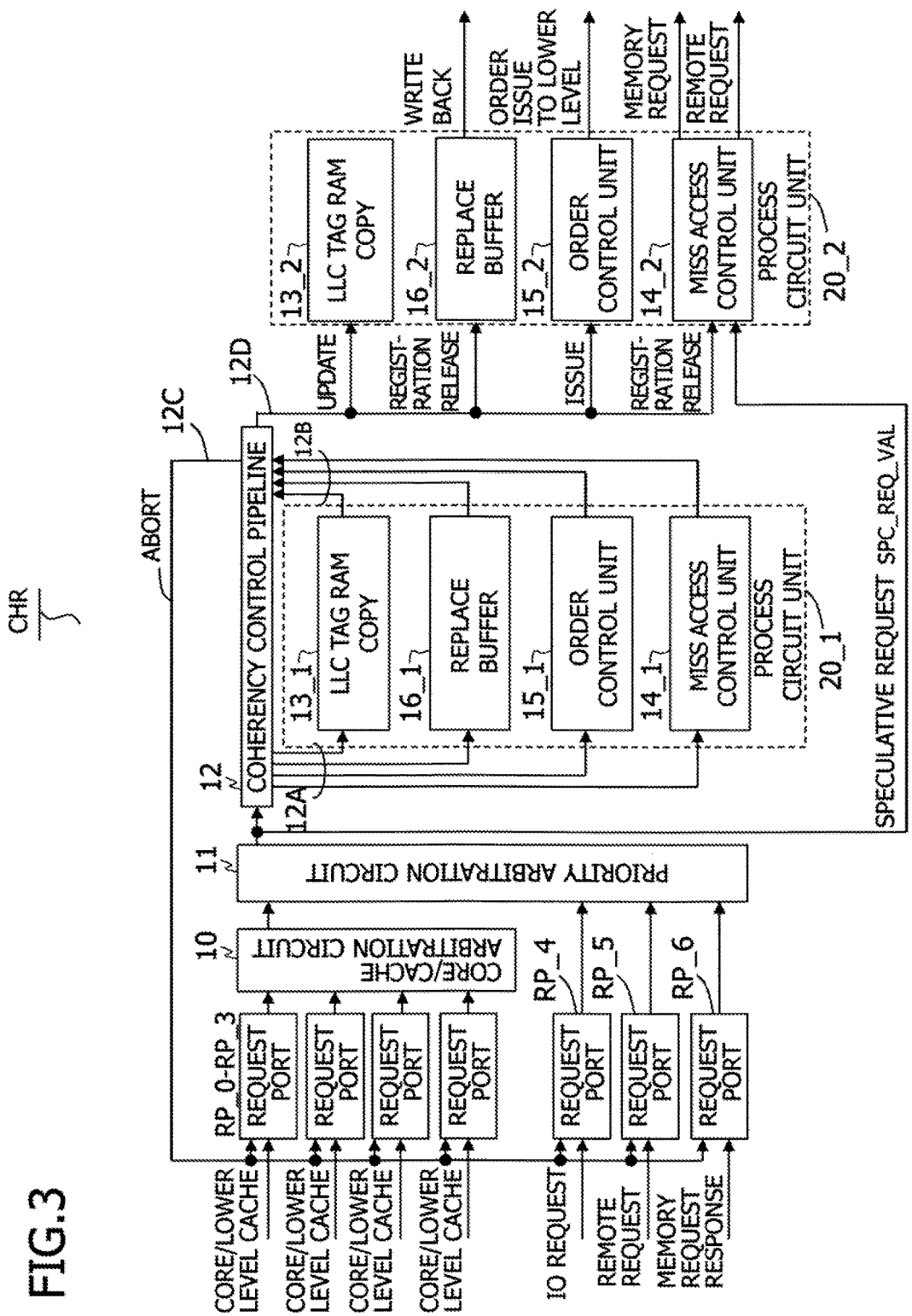
FIG. 3 is a view illustrating an example of the configuration of the coherency control unit.

FIG. 3 is a view illustrating an example of the configuration of the coherency control unit CHR. The cache that includes the LLC and the L2 cache also has the configuration similar to that of the coherency control unit. Hereinbelow, an example of the configuration of the coherency control unit will be described.

The coherency control unit CHR includes request ports RP_0 to RP_3 for receiving the request from the lower level cache or the core (the cluster CLS described above). The lower level cache for the coherency control unit is the LLC. In the example in FIG. 1, four LLC are provided, and four request ports RP_0 to RP_3 are provided in correspondence to the LLCs serving as the requesters. Each request port RP has a plurality of entries, and receives a plurality of the requests from the same requester in the plurality of entries.

In addition, the coherency control unit includes a request port RP_4 that receives an IO request from the IO device, a request port RP_5 that receives a remote request from another CPU, and a request port RP_6 that receives the response to the memory request from the memory controller. The cache is different from the coherency control unit in this point, and the cache includes a request port that receives the order from the upper level, and a request port that receives a memory response from the upper level.

Further, the coherency control unit includes a core/cache arbitration circuit 10 that selects any of the four request ports RP_0 to RP_3, and a priority arbitration circuit 11 that selects any of the selected request port and the other request ports RP_4 to RP_6 based on priorities.

Furthermore, the coherency control unit includes a coherency control pipeline circuit 12 to which the request of the entry of the selected request port is entered (inputted), and process circuit units 20_1 and 20_2 that perform various processes corresponding to the inputted request. Herein, in the drawing, the process circuit unit is divided into two portions 20_1 and 20_2 and illustrated, and the two portions are illustrated corresponding to stages of internal processing and one process circuit unit is configured by the process circuit units 20_1 and 20_2. The process circuit unit is configured by a series of pipeline circuits for each process.

The process circuit unit 20 of the coherency control unit includes, e.g., LLC tag memory copies 13_1 and 13_2, miss access control units 14_1 and 14_2, order control units 15_1 and 15_2, and replace buffers 16_1 and 16_2. In this connection, the cache includes the data memory, and the tag memory of its own.

The coherency control pipeline circuit 12 searches the LLC tag memory copy 13 using the address of the request and checks whether or not other LLCs retain the cache line desired by the request. Further, in the case where the response to the request from the memory controller MC is inputted from the request port RP_6, and the tag memory of the LLC is updated in correspondence to the response, the LLC tag memory copy 13 is also updated.

In the case where the address of the memory request based on the cache miss in the LLC or the address of the request from the IO device or the remote CPU results in the cache miss in the LLC tag memory copy 13, the miss access control unit 14 issues the memory request via the memory controller. Alternatively, in the case where the request from the above local CPU results in the cache miss, the miss access control unit 14 issues the remote request to the memory of another CPU. Each of the memory request and the remote request is a memory-based request to the memory system. When the miss access control unit 14 issues the request to the memory system, the miss access control unit 14 performs exclusive control such that the subsequent request having the same address as the issued request is not received until the miss access control unit 14 receives the data response of the issued request from the memory system.

The order control unit 15 issues the request to the lower level core or cache as the order. For example, in the case where the address of the request from the lower level results in the cache hit in the LLC tag memory copy 13, the order control unit 15 issues the order of data transfer to the LLC that holds the hit data. Alternatively, in order to maintain the coherency between the lower level cores or caches, in the case where a given core stores data, the order control unit 15 issues the order of cache invalidation of data held by another core in the cache in accordance with the MESI protocol or the like. In these cases, the order control unit performs exclusive control such that the subsequent request having the same address is not received until the cache invalidation is completed.

The replace buffer 16 issues write back that writes data expelled from the lower level cache in the memory to the memory controller. In addition, in order to maintain the coherency, the replace buffer 16 performs exclusive control such that the subsequent request having the same address as the issued request is not received until a series of writing operations are completed.

Each of the miss access control unit 14, the order control unit 15, and the replace buffer 16 has a reception entry (a type of a register) that receives the request for the process. The reception entry stores information on the received request (including a request ID and a request address). When each processor in the process circuit unit starts the process corresponding to the request, the processor is controlled so as not to receive a new process to the same address. In addition, the number of the reception entries is limited, and it is not possible to receive the new process unless the reception entry is available. These control operations are executed by the coherency control pipeline circuit 12.

A speculative request valid signal SPC_REQ_VAL in FIG. 3 will be described in an embodiment described later.

Figure 4:
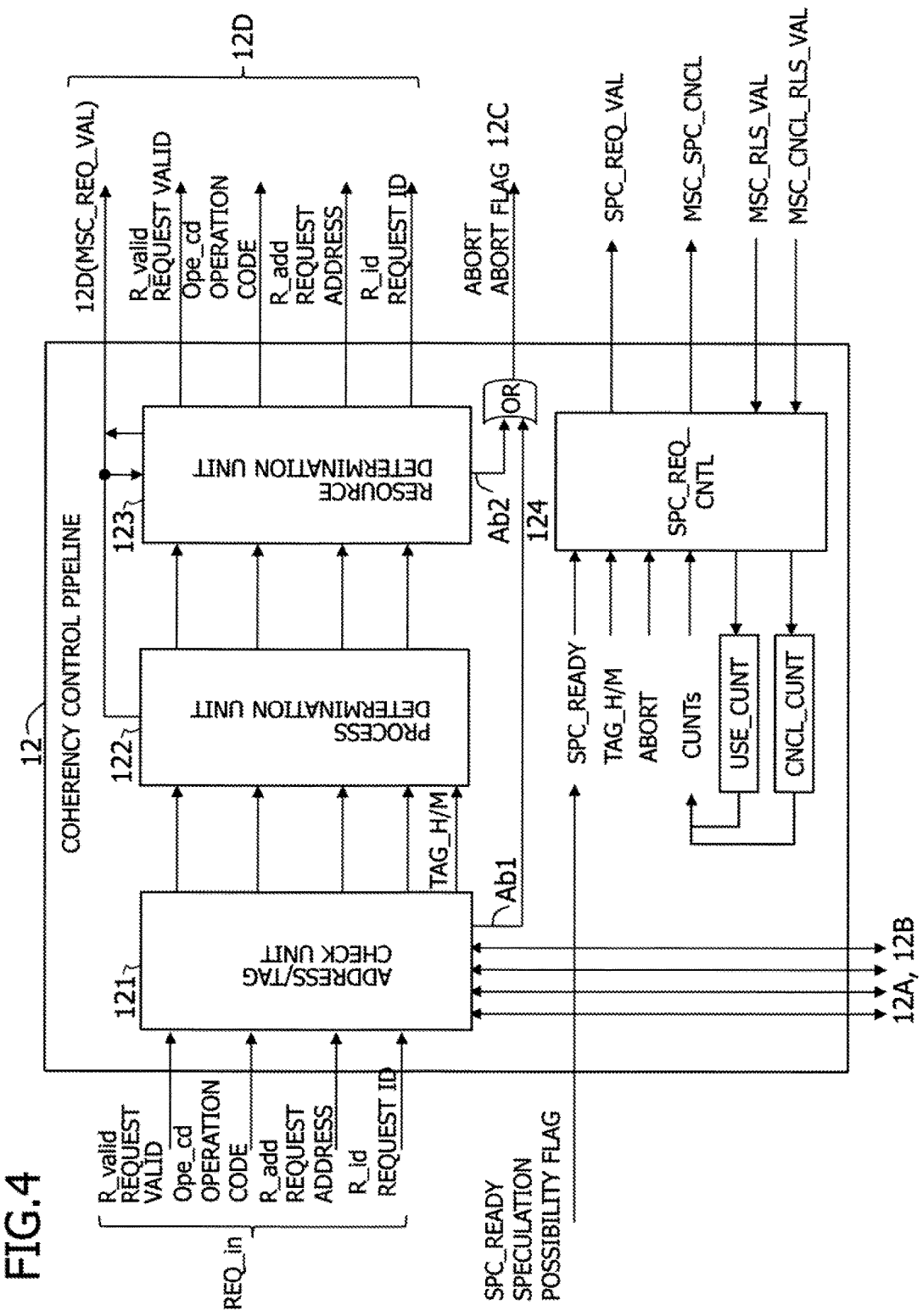
FIG. 4 is a view illustrating an example of the configuration of the coherency control pipeline circuit.

FIG. 4 is a view illustrating an example of the configuration of the coherency control pipeline circuit. The coherency control pipeline circuit 12 determines whether or not it is possible for the process circuit unit 20 to execute the process for the request to a given address, aborts the request in the case where it is not possible to execute the process for the request, and issues the process corresponding to the request to the process circuit unit 20 in the case where it is possible to execute the process. The determination on whether or not the process can be executed corresponds to a determination on whether or not the address of the request conflicts with the address of the request being processed or a determination on whether or not a circuit resource such as the reception entry of the processor can be acquired. When the addresses do not conflict with each other and the circuit resource can be acquired, it becomes possible to execute the process corresponding to the request. The request of which the process is issued is deleted from the request port. On the other hand, the aborted request remains in the request port, and is inputted (entered) to the coherency control pipeline circuit again.

The coherency control pipeline circuit 12 includes an address/TAG check unit 121, a process determination unit 122, and a resource determination unit 123. Request information (a request valid bit R_valid, a request requester ID (core_id), a request entry ID (entry_id), and a request address R_id) is inputted to the coherency control pipeline circuit and flows.

With regard to the description of the specific operation, the address/TAG check unit 121 requests the LLC tag memory copy 13_1 to perform a cache determination of the inputted request (12A), and requests the miss access control unit 14_1, the order control unit 15_1, and the replace buffer 16_1 to check whether or not the address of the inputted request matches the address (exclusive address) that is being processed by each of the individual units 14, 15, and 16 in the process circuit unit 20 (12A). The address that is being processed is retained in the reception entry described above. Subsequently, the address/TAG check unit acquires the result of the cache determination of the the LLC tag memory copy (12B) and the result of the checking of whether or not the address matches the exclusive address of each of the miss access control unit, the order control unit, and the replace buffer (12B). It is not possible to execute the process in the case whether the address matches the exclusive address, and hence the address/TAG check unit 121 outputs a first abort signal Ab1.

Further, the process determination unit 122 determines the process needed for the memory request. For example, the process determination unit 122 issues an order 12D such that data retained in the lower level LLC is transferred to the LLC that has issued the memory request when the cache hit is detected, and issues a memory request 12D to the upper level memory controller or another CPU when the cache miss is detected. As illustrated in the drawing, the issue of the memory request is performed by outputting of a request valid signal MSC_REQ_VAL to the miss access control unit.

Subsequently, the resource determination unit 123 determines whether or not it is possible to acquire the circuit resource needed for the process in any of the miss access control unit 14_2, the order control unit 15_2, and the replace buffer 16_2 that correspond to the determined process. An example of the circuit resource needed for the process includes the above-described reception entry. It is not possible to execute the process in the case where it is not possible to acquire the circuit resource, and hence the resource determination unit outputs a second abort signal Ab2. It is not possible to execute the process also in the case where pipeline stall occurs for some reason, and hence an abort signal that is not illustrated is outputted.

The coherency control pipeline circuit outputs an abort flag ABORT (12C) obtained by performing the OR operation of all of the abort signals Ab1 and Ab2 using the OR gate. The abort flag ABORT means that the request is aborted when the abort flag ABORT is "1", the process corresponding to the request is not executed, and the request is returned to the original access port.

In the case where it is possible to execute the process, the coherency control pipeline circuit 12 issues a process 12D determined by the process determination unit 122 to the process circuit unit 20_2. Examples of the process 12D to be issued include an update process to the tag memory copy 13_2, a memory access process to the miss access control unit 14_2, an order issue process to the order control unit 15_2, and a write back request to the replace buffer 16_2.

When the acquisition of the resource for the process fails in the resource management described above, the entered request is aborted, request information 12C with the abort flag ABORT is fed back to the request port, and the request is thereby returned. Subsequently, the returned request is inputted to the pipeline circuit again after the other requests in the request ports. Specifically, in the case where the request requester ID matches the request entry ID and the abort flag ABORT is "0", the request port RP invalidates (deletes) the request entered in the request port.

Thus, the coherency control pipeline circuit performs a pipeline process on the request to a certain address, and records the address that is being processed in the process circuit unit 20 in the circuit resource such as the reception entry in the processor, and controls the issue of the request so as to avoid a conflict with the same address.

A speculative request control unit 124 in FIG. 4 will be described in an embodiment described later.

Operation of Memory Request and Speculative Request

Figure 5:
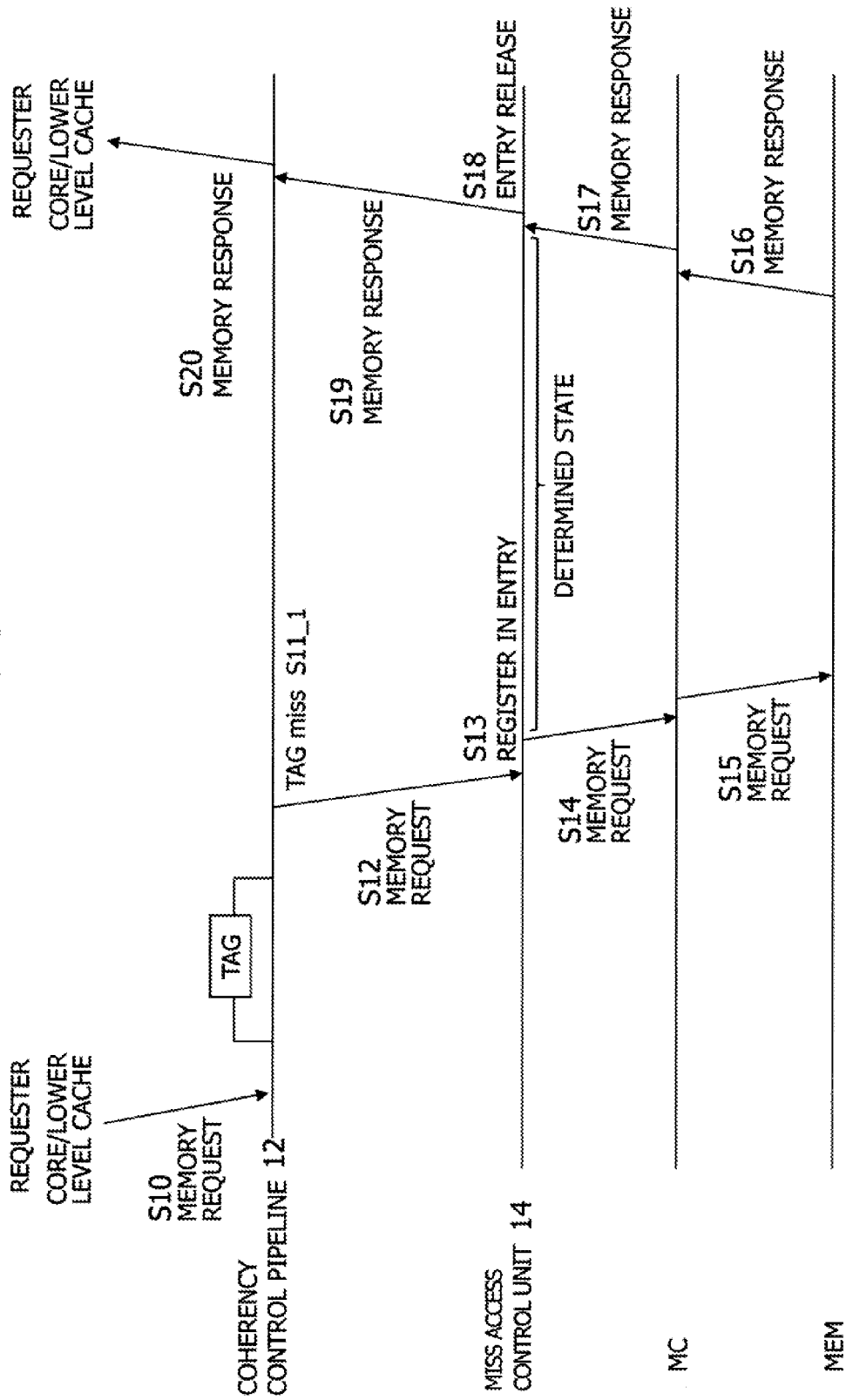
FIG. 5 is a view illustrating an example of an operation sequence of the memory request.

FIG. 5 is a view illustrating an example of an operation sequence of the memory request. The example in FIG. 5 is an example in which, as the result of checking of the tag copy for the address of the inputted memory request by the coherency control pipeline circuit 12, tag miss is detected. That is, this is an operation when the other LLC do not have a cache block that has caused the cache miss at a certain LLC.

First, a certain LLC causes the cache miss and issues the memory request to the request port of the coherency control unit, and the memory request is inputted to the coherency control pipeline circuit 12 (S10). In response to this, the coherency control pipeline circuit 12 checks the LLC tag copy and detects the tag miss (S11_1), and issues the memory request to the miss access control unit 14 (S12). At this point of time, the coherency control pipeline circuit 12 has already confirmed that the address of the inputted memory request does not conflict with the address of the process that is being processed, and the circuit resource in the miss access control unit 14, e.g., an input entry (a type of a register) is acquired.

Consequently, the miss access control unit 14 registers the issued memory request in the entry (S13). Subsequently, the miss access control unit issues the memory request to the memory controller MC (S14), and the memory controller issues the memory request to the memory MEM (S15).

Then, in response to the memory request, the memory MEM returns the memory response such as read data to the memory controller MC (S16), and the memory controller returns the memory response to the miss access control unit 14 (S17). In response to this, the miss access control unit 14 releases the entry in which the memory request is registered (S18) and returns the memory response to the coherency control pipeline circuit (S19), and the coherency control pipeline circuit returns the memory response to the LLC serving as the requester (S20).

In the case of the LLC instead of the coherency control unit CHR, the same operation as that described above is performed.

Figure 6:
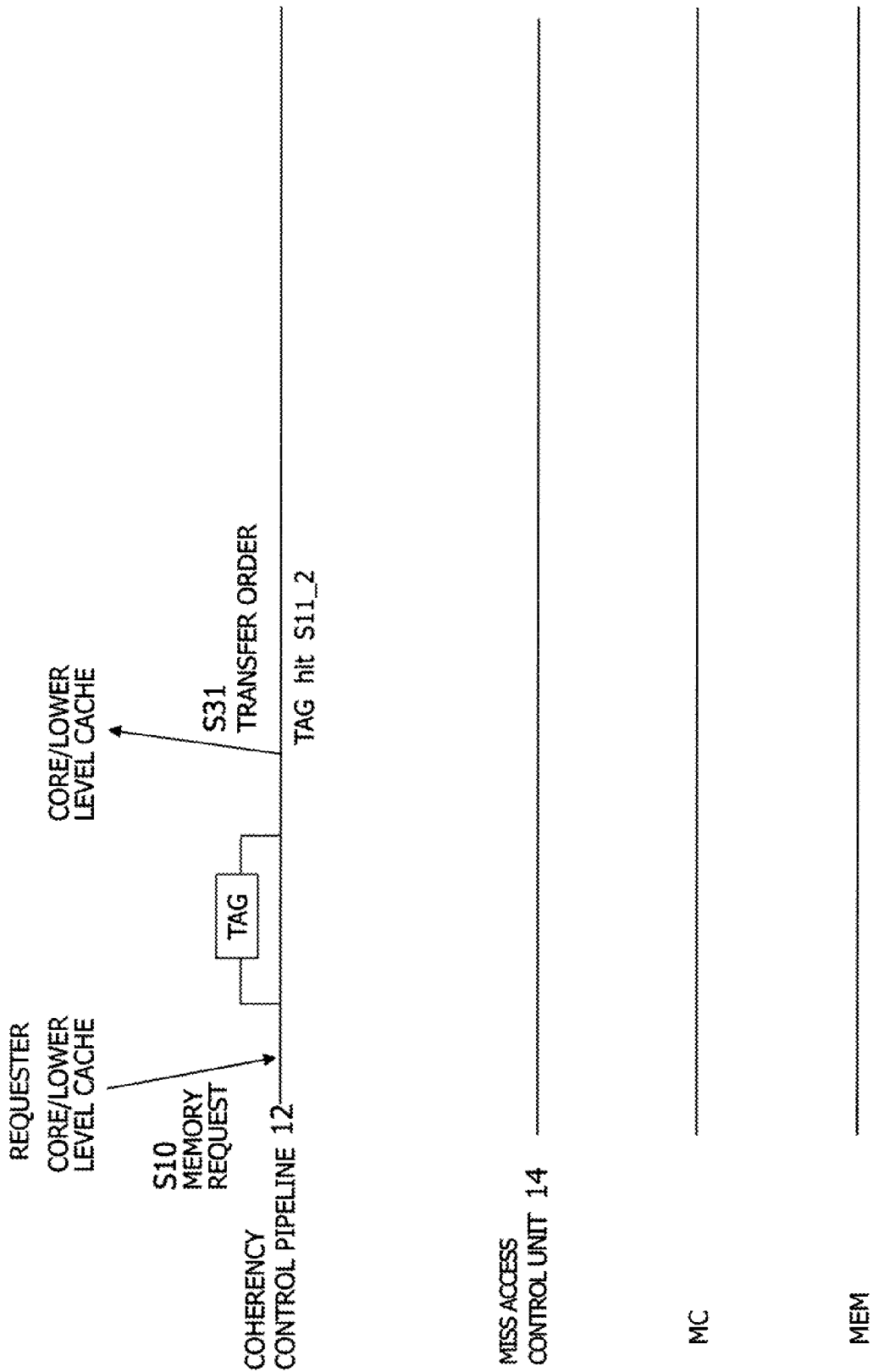
FIG. 6 is a view illustrating an example of the operation sequence of the memory request.

FIG. 6 is a view illustrating an example of the operation sequence of the memory request. The example in FIG. 6 is an example in which, as the result of checking of the LLC tag copy for the address of the inputted memory access by the coherency control pipeline circuit 12, tag hit (cache hit) is detected. That is, this is an operation when another LLC has the cache block that has caused the cache miss of a certain LLC.

First, a certain LLC causes the cache miss and issues the memory request to the request port of the coherency control unit, and the memory request is inputted to the coherency control pipeline circuit 12 (S10). In response to this, the coherency control pipeline circuit 12 checks the LLC tag copy and detects the tag hit (S11_2), and issues a transfer order to the LLC having the cache block via the order control unit 15 such that the cache block is transferred to the LLC serving as the requester (S31).

In the case of the LLC instead of the coherency control unit CHR, the cache control pipeline circuit of the LLC returns the cache block held by the cache to the lower level cache serving as the memory request requester by the cache response.

Present Embodiment

According to the operation of the memory access in FIGS. 5 and 6, in the case where many caches are shared by the LLCs, the tag hit is detected by referring to the LLC tag copy, and the transfer order is issued to the LLC that has the data (cache block) having the address of the memory request, and hence the access to the memory is not needed. In addition, it is not possible to determine the LLC having the data without referring to the LLC tag copy, and hence the operation of referring to the LLC tag copy is not a useless operation.

On the other hand, in the case where the LLCs do not have the data having the address of the memory request, the miss access control unit issues the memory request to the memory controller. However, and the length of time until the data is acquired from the memory is increased by the length of time needed for the reference to the LLC tag copy. In addition, the miss access control unit can issue the memory request without referring to the LLC tag copy.

Accordingly, the coherency control pipeline circuit may start the access operation to the memory speculatively before performing the reference to the LLC tag copy (tag check). In the case where the tag miss occurs, it is possible to save time needed to acquire the reference result of the LLC tag copy, and hence the speculative memory access can reduce the length of time until the data is acquired from the memory.

According to the present embodiment, the coherence control pipeline circuit illustrated in FIG. 3 has a configuration in which a speculative request valid signal MSC_SPC_REQ_VAL is outputted to the miss access control unit 14_2 from the head stage of the pipeline of the coherency control pipeline circuit 12. That is, in the case where the memory request entered to the pipeline circuit may need the access to the memory, the coherency control pipeline circuit makes a request for the speculative request to the miss access control unit 14_2 to cause the miss access control unit to issue the speculative memory access to the memory controller MC before performing the reference to the LLC tag copy.

In the case where the reference result of the LLC tag copy indicates the tag miss, the coherency control pipeline circuit usually issues the memory request to the miss access control unit at the rearward stage of the pipeline circuit 12, when the circuit resource (the entry or the like) of the miss access control unit can be acquired. Therefore, the speculative access issued at the forward stage of the pipeline circuit 12 is a memory access request that bypasses the stage of the pipeline circuit.

According to the present embodiment, the coherency control pipeline circuit 12 illustrated in FIG. 4 includes the speculative request control unit 124 that controls the issue of the speculative request. The speculative request control unit 124 performs a determination on whether or not there is a necessity to issue the speculative request for the inputted memory request, a determination on whether or not the address of the memory request conflicts with the address of the request that is being processed in the process circuit unit 20, and a determination on whether or not the circuit resource in which the speculative request can be registered is present in the miss access control unit 14, i.e., whether or not the available input entry is present and, when each of the determinations is true, the speculative request control unit 124 issues the speculative request to the miss access control unit 14 before the reference result of the LLC tag is obtained.

Note that, since the speculative request is not issued based on the reference result of the LLC tag copy, when the tag hit is detected by the reference to the LLC tag copy, the speculative request becomes useless, the entry in which the speculative request is registered is subject to cancellation, and the entry in the miss access control unit is used uselessly. In addition, in the case where the memory request is aborted in the coherency control pipeline circuit, the speculative request is also subject to cancellation. Accordingly, in the present embodiment, the coherency control pipeline circuit appropriately performs the issue of the speculative request to prevent a bad effect caused by useless use of the entry.

Figure 7:
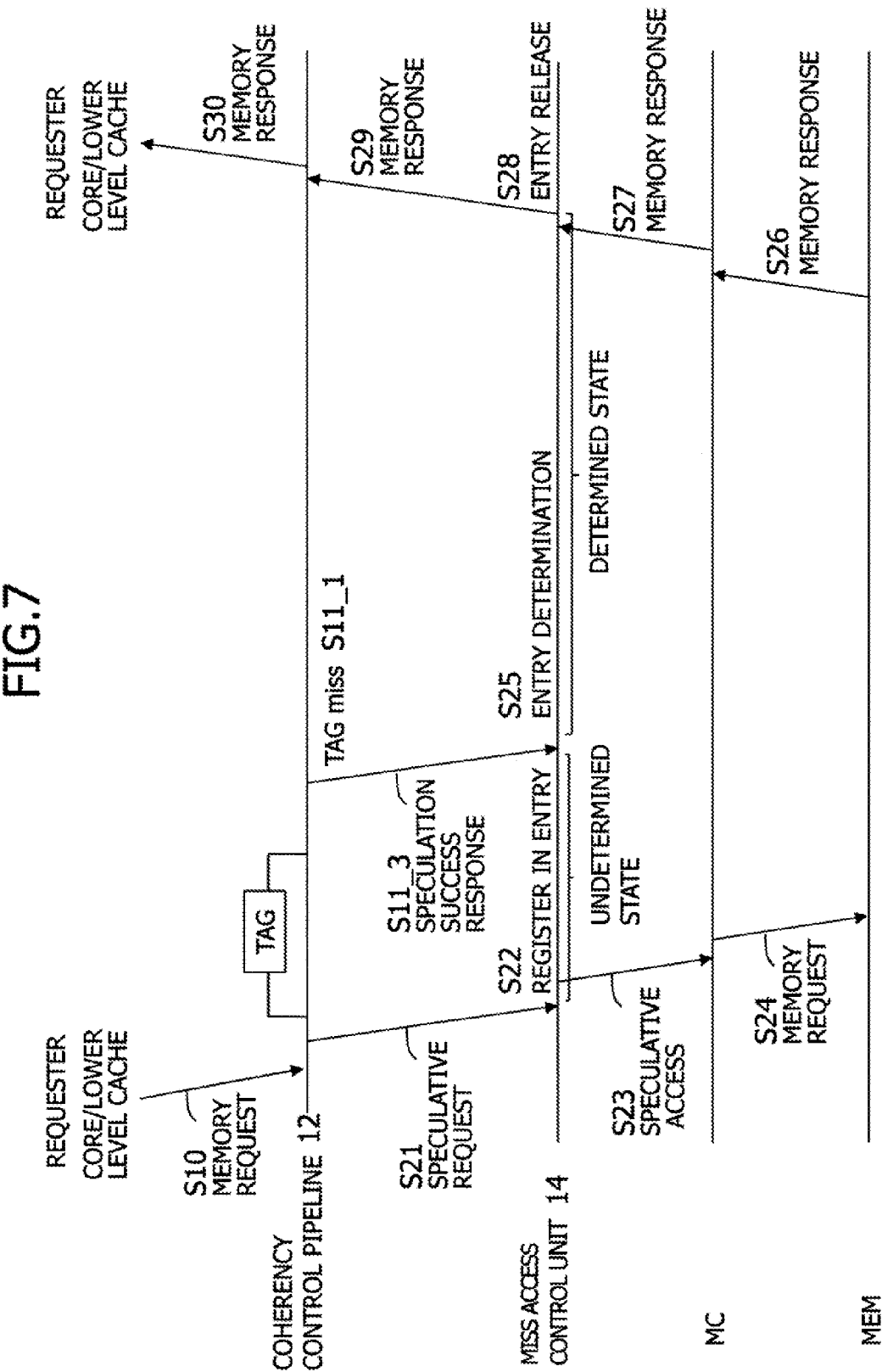
FIG. 7 is a view illustrating the operation sequence in the case where the speculative request has succeeded.

FIG. 7 is a view illustrating the operation sequence in the case where the speculative request has succeeded. First, a certain LLC causes the cache miss, the memory request is received by the request port of the coherency control unit, and the memory request is inputted to the coherency control pipeline circuit 12 (S10). In response to this, the coherency control pipeline circuit 12 issues the speculative request to the miss access control unit 14 (S21).

The miss access control unit 14 has a plurality of the input entries such that a plurality of the memory request can be processed. Therefore, the coherency control pipeline circuit 12 secures the available entry in advance when the coherency control pipeline circuit 12 issues the speculative request.

The miss access control unit 14 registers the speculative request in the available entry (S22), and issues the speculative access to the memory controller MC (S23). At this point of time, the use state of the entry in which the speculative request is registered is not determined yet. While the speculative access is processed, the coherency control pipeline circuit 12 checks the LLC tag copy and detects the tag miss (S11_1), and outputs a speculation success response to the miss access control unit 14 (S11_3). With the speculation success, the use state of the entry in the miss access control unit transitions to a determined state (S25). When the coherency control pipeline circuit 12 outputs the speculation success, the coherence control pipeline circuit 12 has already confirmed that the address of the inputted memory request does not conflict with the address of the process that is being processed.

When the miss access control unit 14 issues the speculative access (S23), the memory controller issues the memory request to the memory MEM (S24). Then, the memory MEM returns the memory response such as read data to the memory controller MC in response to the memory request (S26), and the memory controller returns the memory response to the miss access control unit 14 (S27). In response to this, the miss access control unit 14 releases the entry in which the speculative request is registered (S28) and returns the memory response to the coherency control pipeline circuit (S29), and the coherency control pipeline circuit returns the memory response to the LLC serving as the requester (S30).

Figure 8:
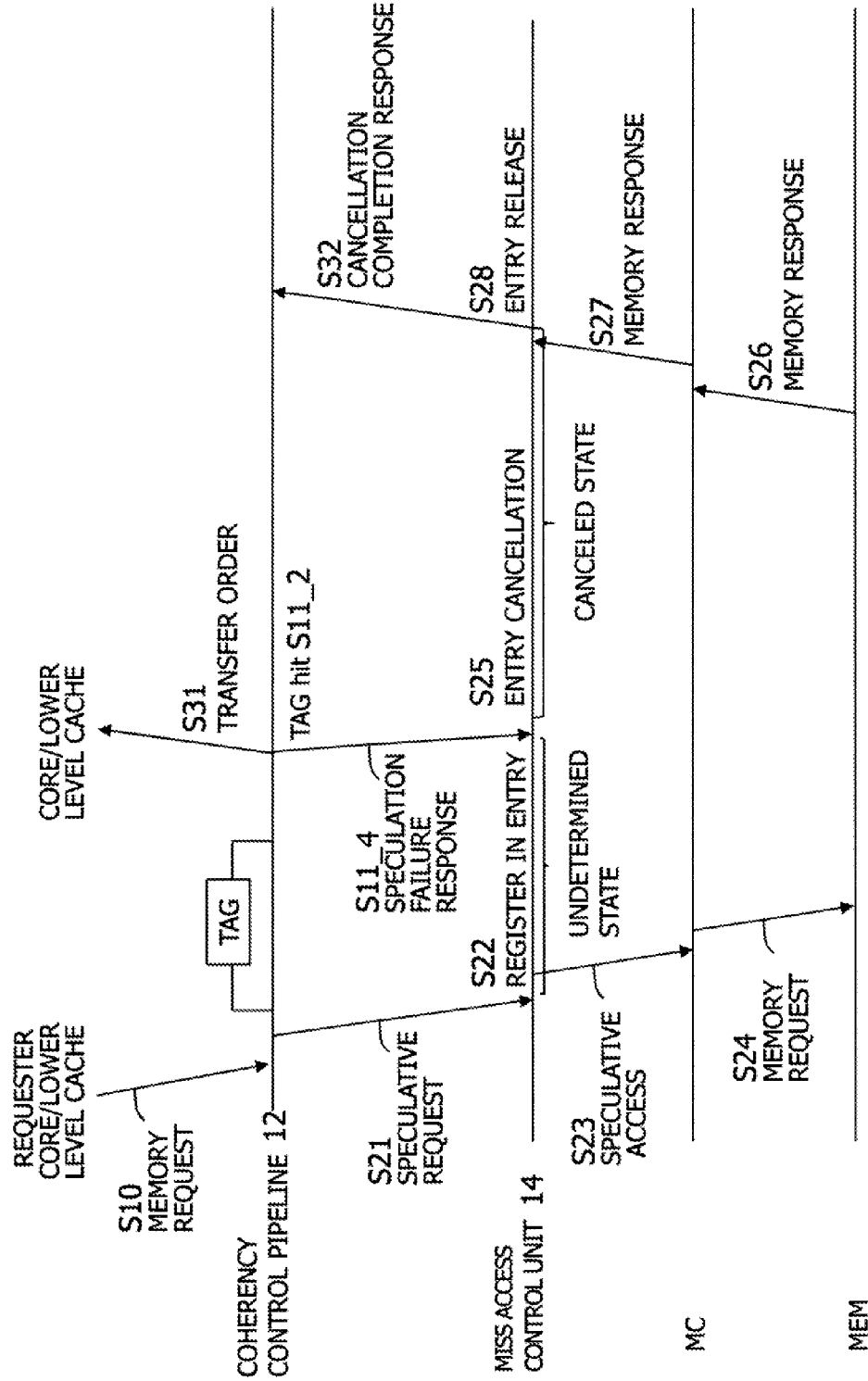
FIG. 8 is a view illustrating the operation sequence in the case where the speculative request has failed.

FIG. 8 is a view illustrating the operation sequence in the case where the speculative request has failed. First, a certain LLC causes the cache miss, the memory request is received by the request port of the coherency control unit, and the memory request is inputted to the coherency control pipeline circuit 12 (S10). In response to this, the coherency control pipeline circuit 12 issues the speculative request to the miss access control unit 14 (S21). Further, the miss access control unit 14 registers the speculative request in the entry (S22) and issues the speculative access to the memory controller, and the memory request is issued to the memory MEM (S24). The operation sequence up to this step is the same as that in FIG. 7.

In FIG. 8, the coherency control pipeline circuit 12 refers to the LLC tag copy and detects the tag hit (S11_2) and, in response to this, transmits a speculation failure response to the miss access control unit 14 (S11_4). In addition, the coherency control pipeline circuit 12 issues the transfer order to the LLC that has the data via the order control unit 15 (S31). With this, the use state of the entry of the miss access control unit is determined as a canceled state (S25). The miss access control unit has already issued the speculative access, and hence the miss access control unit retains the entry in the canceled state.

Then, each of the memory MEM and the memory controller MC returns the memory response (S26, S27) and, the entry corresponding to the memory response is in the canceled state, and hence the miss access control unit 14 returns a cancellation completion response to the coherency control pipeline circuit 12 (S32), and releases the entry (S28).

Since the miss access control unit retains the entry in the canceled state, there are cases where another subsequent memory request becomes unable to use the entry, and it becomes impossible to effectively use the entry. The response time of the memory is very slow in speed relative to the clock of the processor, and time corresponding to several hundred cycles is needed before the response of one memory request is returned. During the time period, it is not possible for another memory request to use the entry in the canceled state in the miss access control unit, and hence the occupation of the entry (circuit resource) caused by the speculative request failure leads to a significant loss.

Next, an example of the transition of the use state of the input entry of the miss access control unit will be described. In order to control the processes of a plurality of the memory requests, the miss access control unit 14 has a plurality of the input entries (registers). In the input entry, information such as an operation code, an address, a request ID, and the use state (canceled state or not) of the issued memory request is stored. The miss access control unit retains the input entry until the miss access control unit receives the memory response to the memory request, and uses the input entry for a determination on whether or not the address conflicts with the address of the subsequent memory request, and a determination on whether the received memory response is to be transferred to the coherency control pipeline circuit or a cancellation response is to be returned.

Each of FIGS. 9 and 10 is a view illustrating the transition of the input entry use state in the case where the speculative request and the speculative access do not fail due to the tag miss. It is assumed that the number of input entries in the miss access control unit is 32. In the drawings, the available entry is an entry in which the memory request is not registered. A determined entry is an entry in which the speculative request has been registered and for which the speculation has succeeded, or an entry in which the usual request issued after the tag miss determination is registered. A canceled entry is an entry in which the speculative request has been registered but for which the speculation has failed. Further, an undetermined entry is an entry in which the speculative request has been registered but for which it has not yet been determined whether the speculation has succeeded or failed.

In an initial state S1 in FIG. 9, no entry is used and all of the entries are in an unused state, and are available entries. In a state S2, a specific LLC causes the cache miss and issues the memory request, the coherency control pipeline circuit issues the speculative request to the miss access control unit, and the undetermined entry that has received the speculative request is generated.

In a state S3, a plurality of the speculative requests are issued afterward, and a plurality of the undetermined entries are generated. How many number the speculative requests can be present as the undetermined entries depends on the length of the pipeline circuit of the miss access control unit. Herein, it is assumed that the maximum number of the speculative requests that can be present as the undetermined entries is five.

In a state S4, the reference to the LLC tag copy is completed for the speculative request that has been issued first, the tag miss is detected, therefore no LLC has the data, and hence the speculative request (speculative access) is successful and the first undetermined entry is changed to the determined entry.

In a state S5 in FIG. 10, the tag miss is detected for all of the speculative requests afterward, and the undetermined entries are changed to the determined entries. As in states S5_1 to S5_4, in a situation where only the tag miss occurs, even when all of the entries of the miss access control unit are used by the speculative requests, the entries are not wasted, and the issue of the speculative request is preferable.

Figure 11:
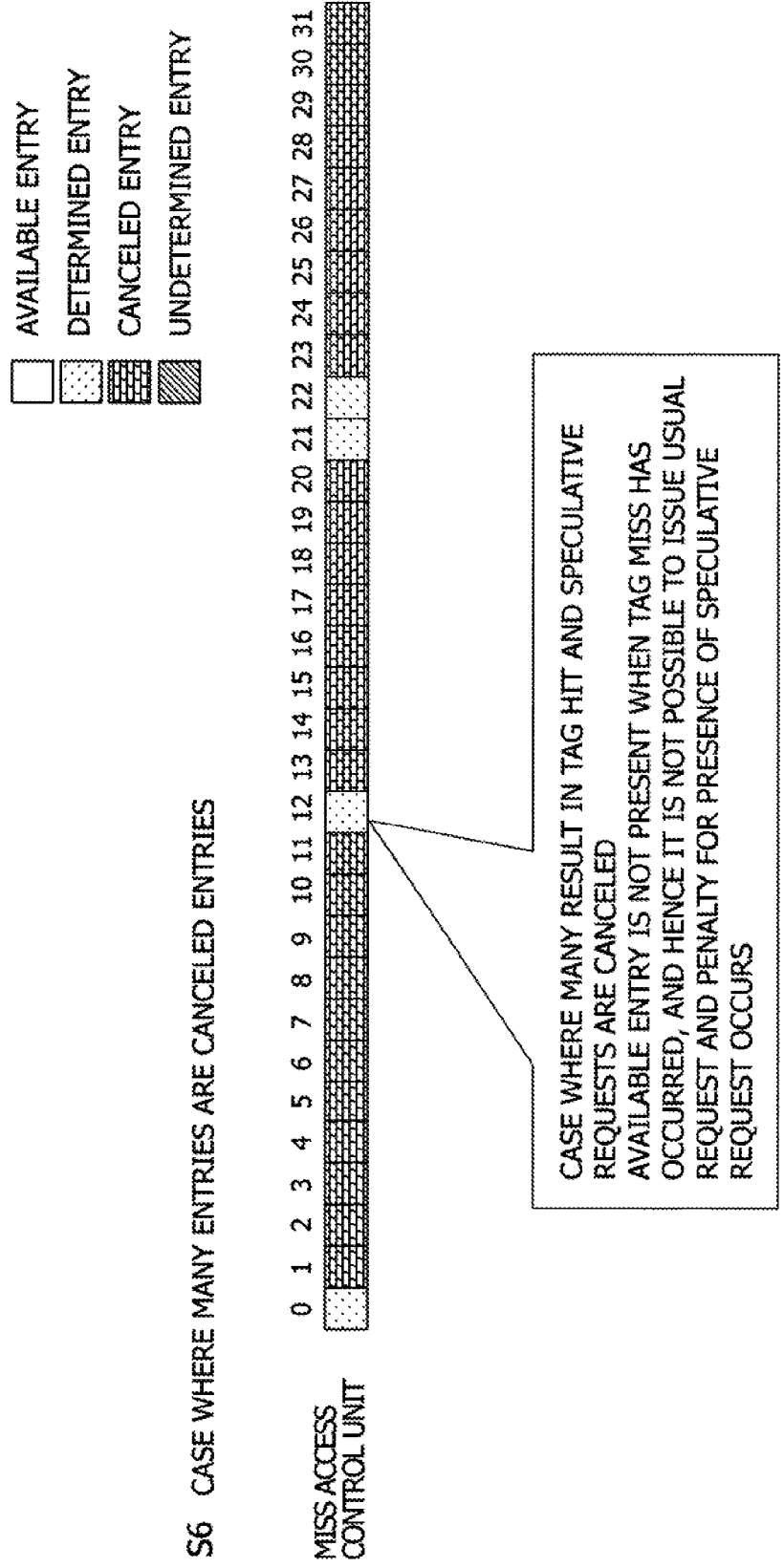
FIG. 11 is a view illustrating the transition of the entry use state in the case where many failures of the speculative request and the speculative access occur due to the tag hit.

FIG. 11 is a view illustrating the transition of the entry use state in the case where many failures of the speculative request and the speculative access occur due to the tag hit. In a state S6, 28 entries out of 32 entries are changed to canceled entries. In such a state, since all of the 32 entries are used, it is not possible to issue additional speculative request for the memory request that is inputted to the pipeline circuit afterward. Further, even when the inputted memory request results in the tag miss as the result of the reference to the LLC tag copy and the issue of the memory request to the miss access control unit is needed, all of the entries are used, and hence it is not possible to issue the memory request to the miss access control unit. As a result, the inputted memory request is aborted in the coherency control pipeline circuit and is returned to the request port, and the input from the request port and the abort are repeated until the entry of the miss access control unit becomes available.

To cope with this, as a method for averting a penalty for the failure of the speculative request (speculative access), the issue condition of the speculative request that the number of used entries is not more than an upper limit value less than the total number of entries is set such that the speculative requests are prevented from using all of the entries uselessly. That is, the available entry that can be used by the memory request that needs to be issued due to the tag miss is secured.

Figure 12:
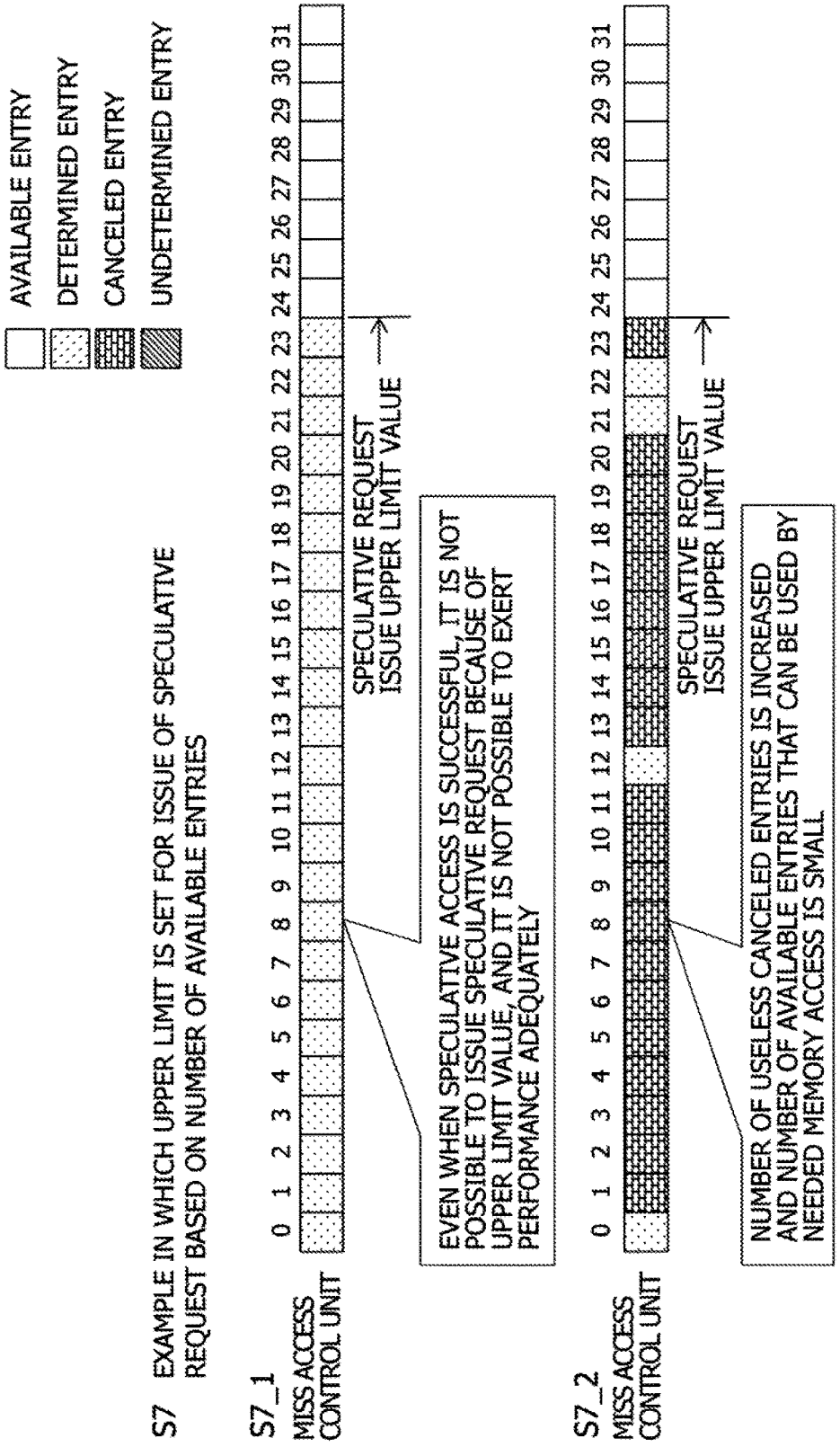
FIG. 12 is a view illustrating an example of the state in which the issue condition of the speculative request is set such that the number of used entries is not more than a predetermined upper limit value.

FIG. 12 is a view illustrating an example of the state in which the issue condition of the speculative request is set such that the number of used entries is not more than a predetermined upper limit value. In the example in FIG. 12, as the issue condition of the speculative request, the upper limit value of the number of used entries is set to 24 or less. In a state S7_1, 24 used entries are changed to the determined entries due to the speculative request success and, therefore, the number of canceled entries is 0. In this case, even when the speculative request further uses the entry, it is unlikely that the waste by the canceled entry occurs. However, the issue of the subsequent speculative request is limited with the upper limit value of the number of used entries, and a latency reduction effect by the speculative request is limited. Consequently, in the state S7_1, the upper limit value is too low, and the provision of the upper limit value leads to a reduction in the use efficiency of the entry.

On the other hand, in a state S7_2, most of the 24 used entries are changed to the canceled entries. As a result, the number of available entries that can be used by the memory request that needs to be issued is only 8 that is obtained by subtracting the upper limit value 24 from the total number of entries 32. Accordingly, although the number of canceled entries is large, the upper limit value, which is 24, is too high, and therefore the number of available entries that can be used by the memory request that needs to be issued is small. However, when the upper limit value is set to be low, the issue opportunity of the speculative request is reduced, which is not preferable.

Figure 13:
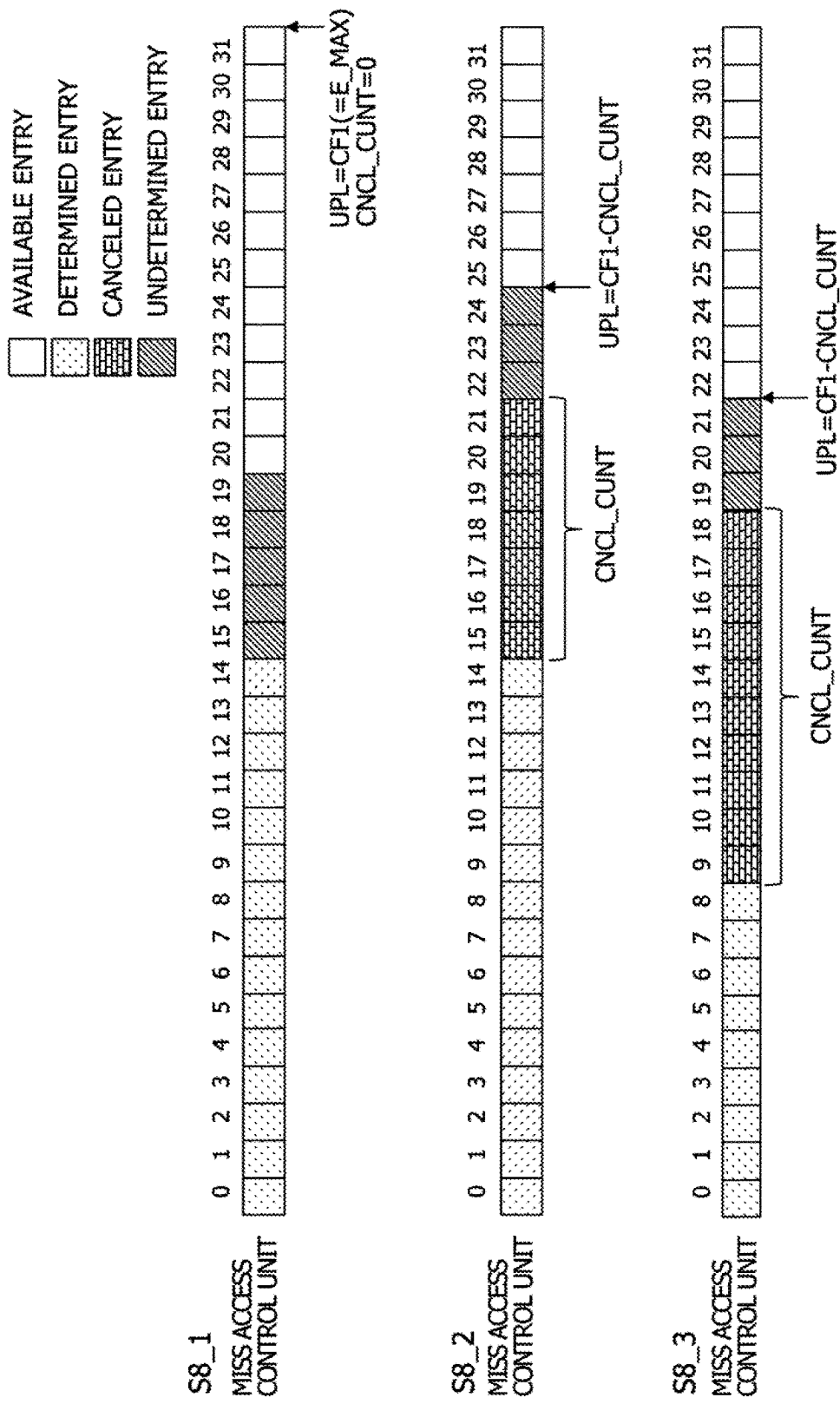
FIG. 13 is a view for illustrating a method for appropriately controlling the number of issued speculative requests in the present embodiment.

FIG. 13 is a view for illustrating a method for appropriately controlling the number of issued speculative requests in the present embodiment. In the present embodiment, the coherency control pipeline circuit controls the upper limit value of the number of used entries as the condition for the issue of the speculative request such that the upper limit value thereof has an appropriate value in accordance with the number of canceled requests. For example, the upper limit value is set to be higher when the number of canceled requests is smaller, and the upper limit value is set to be lower when the number of canceled requests is larger. As a result, the number of available entries is reduced and the issue opportunity of the speculative request is increased when the number of canceled requests is smaller, and the number of available entries is increased and the issue opportunity of the speculative request is reduced when the number of canceled requests is larger.

In FIG. 13, a state S8_1 is an example in which the number of canceled entries is 0. In this case, an upper limit value UPL of the number of used entries as the condition for the issue of the speculative request is set to a value CF1 that is equal to the total number of entries E_MAX. That is, the issue of the speculative request is permitted until the number of used entries reaches the total number of entries E_MAX.

On the other hand, in a state S8_2, the number of canceled entries CNCL_CUNT is increased to 7. In this case, the issue of the speculative request is permitted until the number of used entries reaches a number (32−7=25) that is lower than the total number of entries E_MAX (=CF1) by the number of canceled entries CNCL_CUNT. That is, the upper limit value UPL is set to the number obtained by subtracting the number of canceled entries CNCL_CUNT from the total number of entries E_MAX (=CF1).

Further, in a state S8_3, the number of canceled entries CNCL_CUNT is further increased to 10. In this case as well, when the upper limit value UPL is set to the number obtained by subtracting the number of canceled entries CNCL_CUNT from the total number of entries E_MAX (=CF1), the upper limit value UPL is 32−10=22, and the upper limit value UPL is set to be lower than that in the state S8_2.

As described above, the coherency control pipeline circuit controls the upper limit value such that the upper limit value is set to be lower as the number of canceled entries is increased and is set to be higher as the number thereof is reduced, permits the issue of the speculative request until the number of used entries in the miss access control unit reaches the upper limit value UPL, and prohibits the issue of the speculative request when the number of used entries is not less than the upper limit value UPL.

Further, the above value CF1 may be set to a value lower than the total number of entries E_MAX by a predetermined number. With this, even when the number of canceled entries CNCL_CUNT is 0, it is possible to prevent the speculative requests from using all of the entries. With this, it becomes possible for the memory access that needs to be issued after the checking by the reference to the tag copy can always use the entry.

First Embodiment

According to the present embodiment, as illustrated in the configuration of the coherency control unit illustrated in FIG. 3, the coherency control pipeline circuit 12 has the configuration in which the speculative request valid signal SPC_REQ_VAL can be issued to the miss access control unit 14_2 from the head of the pipeline circuit.

Figure 15:
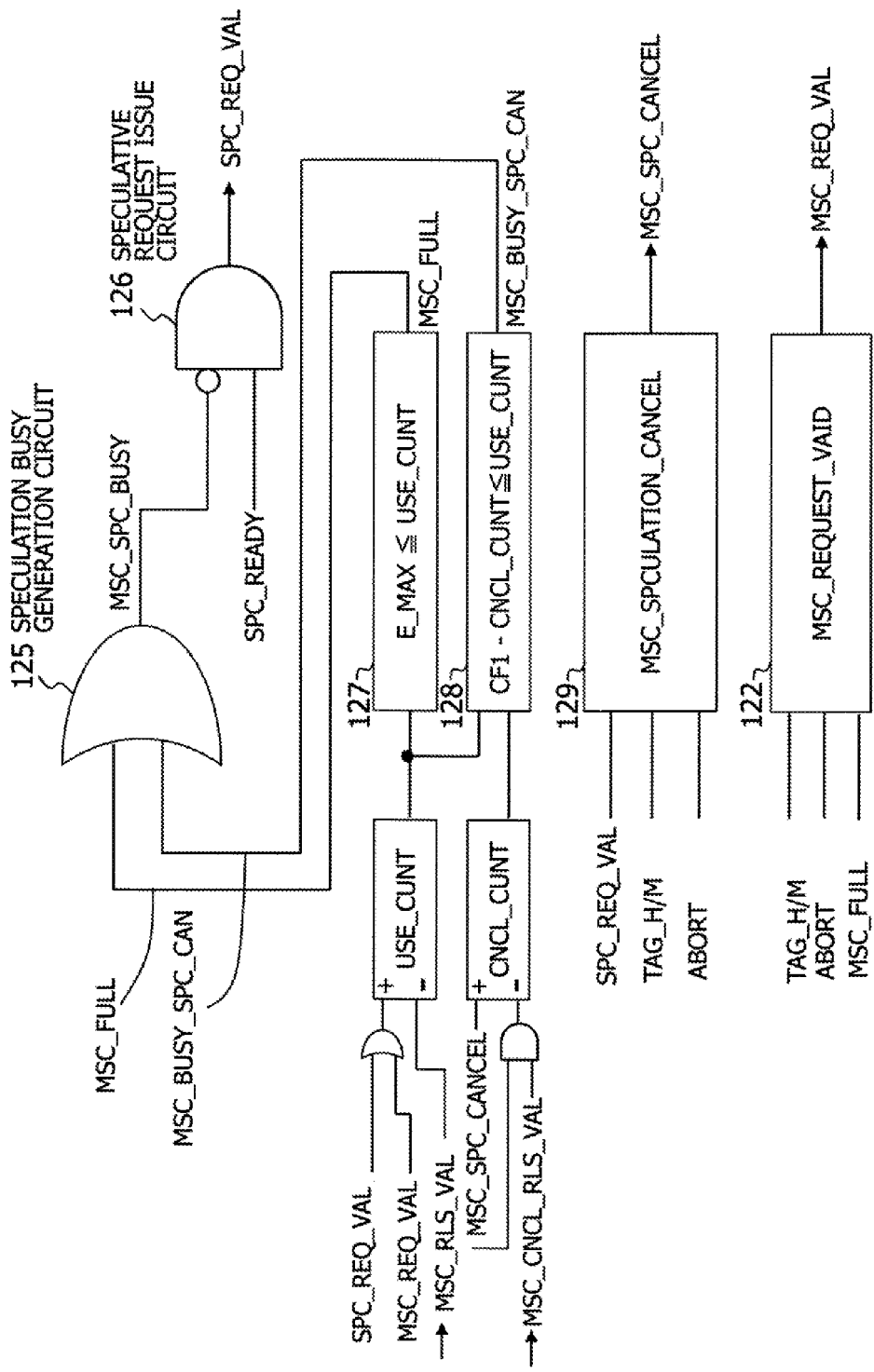
FIG. 15 is a view illustrating an example of the configuration of the speculative request control unit 124 in the present embodiment.

In addition, in the coherency control pipeline circuit 12 illustrated in FIG. 4, the speculative request control unit 124 is provided. Detailed structure of the speculative request control unit 124 is shown in FIG. 15. In the case where a speculation possibility flag SPC_READY indicating that there is a possibility that the memory request needs the process by the miss access control unit is true, the speculative request control unit 124 generates the speculative request valid signal SPC_REQ_VAL for notification of the issue of the speculative request based on a counter value of a used entry number counter USE_CUNT that counts the number of used entries and a count value of a canceled entry number counter CNCL_CUNT that counts the number of canceled entries, and outputs the speculative request valid signal SPC_REQ_VAL to the miss access control unit. With this, before the determination result of the stage of the address/TAG check unit 121 that refers to the LLC tag copy, a memory request REQ_in can be speculatively issued to the miss access control unit with the speculative request valid signal SPC_REQ_VAL that validates the speculative request.

In addition, the speculative request control unit 124 generates a speculative request cancellation signal MSC_SPC_CANCEL in accordance with a tag hit/miss signal TAG_H/M and an abort signal ABORT, and outputs the speculative request cancellation signal MSC_SPC_CANCEL to the miss access control unit. Further, the speculative request control unit 124 decrements the count value of the used entry number counter USE_CUNT in response to a release valid signal MSC_RLS_VAL for notification of the release of the determined entry from the miss access control unit, and decrements the count value of the canceled entry number counter CNCL_CUNT in response to a canceled entry release valid signal MSC_CNCL_RLS_VAL for notification of the release of the canceled entry.

As described above, the used entry number counter USE_CUNT managed by the coherency control pipeline circuit 12 is incremented when the speculative request is issued or when the memory request of which the speculative request is not issued is issued at a usual timing after the tag miss determination by the reference to the tag copy. In addition, the used entry number counter USE_CUNT is decremented when the miss access control unit receives the memory response and releases the entry. See FIG. 15.

As described above, the canceled entry number counter CNCL_CUNT is incremented when the tag hit determination by the reference to the tag copy for the speculative request indicates the tag hit or when the memory request of which the speculative request is issued is aborted due to other factors. The coherency control pipeline circuit 12 notifies the miss access control unit that the memory request of the speculative request is canceled by using the above-described speculative request cancellation signal MSC_SPC_CANCEL and, with this, the cancellation is retained as a speculation cancellation flag SPC_CANCEL_FLG in the miss access control unit. See FIGS. 14, 15.

On the other hand, in the case where the memory response is returned from the memory system, and the entry corresponding to the memory response retains the speculation cancellation flag, the miss access control unit releases the entry, and instructs the coherency control pipeline circuit to decrement the canceled entry number counter CNCL_CUNT by using the above-described canceled entry release valid signal MSC_CNCL_RLS_VAL. At this point, the miss access control unit also outputs the release valid signal MSC_RLS_VAL.

Therefore, the value of the canceled entry number counter CNCL_CUNT indicates the number of entries waiting for release during a time period from the failure of the speculative request to the response from the memory.

Figure 14:
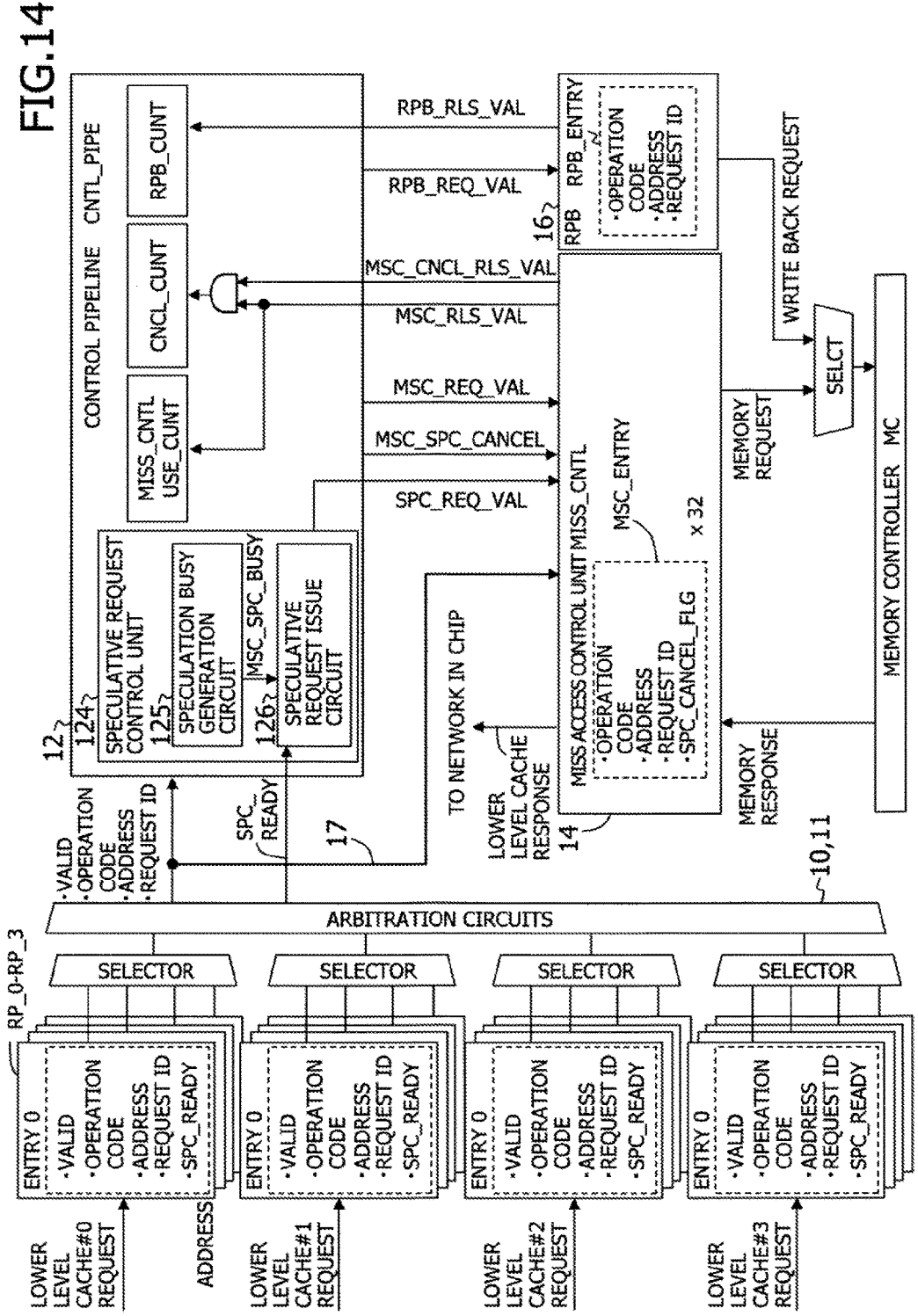
FIG. 14 is a view illustrating mainly the relationship between the coherency control pipeline circuit 12 and the miss access control unit 14 in the coherency control unit CHR in the present embodiment.

FIG. 14 is a view illustrating mainly the relationship between the coherency control pipeline circuit 12 and the miss access control unit 14 in the coherency control unit CHR in the present embodiment. The request ports RP_0 to RP_3 receive the requests issued from the lower level caches. Each request port has a plurality of entries (four entries in FIG. 14). The plurality of entries in each request port are selected by a selector, and further selected by the arbitration circuits 10 and 11, and are inputted to the coherency control pipeline circuit 12.

When the request port has received the request from the lower level cache, the request port may determine whether or not there is a possibility that the memory request is issued to the miss access control unit based on the operation code and the address included in the request, and may set the speculation possibility flag SPC_READY of each entry to "1" in the case where there is the possibility.

At this point, the speculation possibility flag SPC_READY may be set to "0" for the request of which the memory request is not issued to the miss access control unit obviously, which can be determined by checking the operation code or the address without referring to the LLC tag copy. For example, in the case where the address of the request indicates the non-cacheable address space, the memory access is not issued. Therefore, for such memory request, the speculative request does not need to be issued to the miss access control unit.

The above speculation possibility flag SPC_READY can be used for control in which the speculative request is issued only when the request of the request port is inputted to the coherency control pipeline circuit for the first time, and the speculative request is not issued at the time of the second or subsequent input. That is, in the case where the address of the speculative request conflicts with the address of the order that is being processed in the order control unit, and the speculative request is aborted, the request is returned to the request port. At this point, the above-described control is possible by performing control in which the speculation possibility flag SPC_READY is changed to "0".

With this control, it is possible to prevent issuing the speculative request again when the request is inputted to the pipeline circuit again and the issue of a plurality of the speculative requests to the same request. The speculative request is canceled when the speculative request is aborted in the pipeline circuit. Further, according to exclusive control due to the conflict of the address, the abort is repeated a plurality of times in many cases until the process of the request or the order that is being processed is completed and a locked state is released. Therefore, when the speculative request is issued every time the request that is aborted once is inputted to the pipeline circuit again, the entries in the miss access control unit are occupied by the useless canceled entries, which leads to a reduction in the use efficiency of the entry.

The request selected by the arbitration circuits 10 and 11 is inputted to the coherency control pipeline circuit 12. Subsequently, in the speculative request control unit 124, a speculation busy generation circuit 125 determines whether or not the issue of the speculative request is permitted based on the value of the used entry number counter USE_CUNT and the value of the canceled entry number counter CNCL_CUNT, and generates a speculation busy signal MSC_SPC_BUSY. Further, a speculative request issue circuit 126 generates the speculative request valid signal SPC_REQ_VAL indicating that the speculative request is valid based on the speculation busy signal MSC_SPC_BUSY and the speculation possibility flag SPC_READY, and outputs the speculative request valid signal SPC_REQ_VAL to the miss access control unit 14. Specific examples of the speculation busy generation circuit and the speculative request issue circuit will be described later.

When the cache determination by the reference to the LLC tag copy indicates the tag hit, or the memory request of the speculative request is aborted due to other factors, the speculative request control unit 124 generates the speculative request cancellation signal MSC_SPC_CANCEL, and outputs the speculative request cancellation signal MSC_SPC_CANCEL to the miss access control unit 14, and notifies the miss access control unit 14 of the failure of the speculative request (speculation cancellation notification). Specifically, as the speculation cancellation notification, the control pipeline circuit 12 transmits a usual request valid signal MSC_REQ_VAL=1 and the speculative request cancellation signal MSC_SPC_CANCEL=1 to the miss access control unit 14.

On the other hand, in the case where the cache determination indicates the tag miss and the speculative request has succeeded, the coherency control pipeline circuit 12 outputs a usual request valid signal MSC_REQ_VAL to the miss access control unit 14 to notify the miss access control unit 14 of the success of the speculative request. Specifically, as the above speculative request success notification, the control pipeline circuit 12 transmits the usual request valid signal MSC_REQ_VAL=1 and the speculative request cancellation signal MSC_SPC_CANCEL=0 to the miss access control unit 14.

In addition, when the memory request of which the speculative request is not issued results in the tag miss as the result of the reference to the LLC tag copy, and the memory request is not aborted due to other factors, in the case where the number of used entries in the miss access control unit is less than the total number of entries, the coherency control pipeline circuit 12 outputs the usual request valid signal MSC_REQ_VAL that validates the usual memory request to the miss access control unit 14 to notify the miss access control unit of the usual memory request. Specifically, as the notification of the usual memory request, the control pipeline circuit 12 transmits the usual request valid signal MSC_REQ_VAL=1 and the speculative request cancellation signal MSC_SPC_CANCEL=0 to the miss access control unit 14.

A combination signal of MSC_REQ_VAL=1 and MSC_SPC_CANCEL=0 mentioned above is received by the miss access control unit 14 as an entry new acquisition request. Note that the miss access control unit 14 retains a speculation done flag SPC_DONE (not illustrated) in the entry for the speculative request. Accordingly, in the case where the miss access control unit 14 has received the combination signal of MSC_REQ_VAL=1 and MSC_SPC_CANCEL=0, the miss access control unit 14 determines that the combination signal is the notification of the speculation success in the case of SPC_DONE=1, and issue no more memory request to the memory controller. On the other hand, in the case of SPC_DONE=0, the miss access control unit 14 determines that the combination signal is the new memory request, performs the entry registration, and issues the memory request to the memory controller.

As illustrated in FIG. 14, the miss access control unit 14 is notified of information on the request inputted to the coherency control pipeline circuit 12 via a bus 17. When the speculative request valid signal SPC_REQ_VAL is brought into the valid state "1", the miss access control unit registers the information on the request in the bus 17 in the entry. Similarly, when the above usual request valid signal MSC_REQ_VAL is brought into the valid state "1" for the request of which the speculative request is not issued, the miss access control unit registers the information on the request in the bus 17 in the entry.

On the other hand, when the above speculative request cancellation signal MSC_SPC_CANCEL=1 occurs, the miss access control unit sets the speculation cancellation flag SPC_CANCEL_FLG of the entry in which the request is registered to "1". This indicates that the entry is the canceled entry.

FIG. 15 is a view illustrating an example of the configuration of the speculative request control unit 124 in the present embodiment. As illustrated in FIG. 14, the speculative request control unit 124 includes the speculation busy generation circuit 125 and the speculative request issue circuit 126.

The speculative request control unit 124 includes the speculation busy generation circuit 125 that determines the current use situation of the entry in the miss access control unit from the count values of the used entry number counter USE_CUNT and the canceled entry number counter CNCL_CUNT, and performs a determination on whether the issue of the speculative request is permitted or prohibited. Further, the speculative request control unit 124 includes the speculative request issue circuit 126 that brings the speculative request valid signal SPC_REQ_VAL into the valid state "1" in the case where the issue of the speculative request is permitted when the speculation possibility flag SPC_READY of the inputted request indicates a speculation possible state "1".

The speculation busy generation circuit 125 generates the speculation busy signal MSC_SPC_BUSY using the OR operation of an all entry use signal MSC_FULL indicating that all of the entries are used and a first speculation busy signal MSC_BUSY_SPC_CAN based on the number of used entries and the number of canceled entries. The issue of the speculative request is prohibited when the speculation busy signal MSC_SPC_BUSY is "1", and the issue of the speculative request is permitted when the speculation busy signal MSC_SPC_BUSY is "0".

In the case where the counter value of the used entry number counter USE_CUNT is not less than the total number of entries E_MAX, a logic circuit 127 in the drawing sets the all entry use signal MSC_FULL to "1" (issue prohibition). In addition, in the case where the counter value of the used entry number counter USE_CUNT is not less than the number obtained by subtracting the counter value of the canceled entry number counter CNCL_CUNT from a first set value CF1 (e.g., a number equal to or less than the total number of entries E_MX), a logic circuit 128 sets the first speculation busy signal MSC_BUSY_SPC_CAN to "1" (issue prohibition).

Therefore, in the first embodiment, in the case where the number of used entries is not less than the total number of entries or the case where the number of used entries is not less than the number obtained by subtracting the number of canceled entries from the first set value CF1, the issue of the speculative request is inhibited, i.e., prohibited. On the other hand, in the case where the number of used entries is less than the total number of entries and the number of used entries is less than the upper limit value obtained by subtracting the number of canceled entries from the first set value CF1, the issue of the speculative request is permitted.

Specifically, by using the following logic operation expressions, it is determined whether the issue of the speculative request is inhibited or permitted.

issue inhibition of speculative request=(E_MAX≤USE_CUNT) OR {(CF1−CNCL_CUNT)≤USE_CUNT}
issue permission of speculative request=(E_MAX>USE_CUNT) AND {(CF1−CNCL_CUNT)>USE_CUNT}

The first condition for the issue inhibition of the speculative request (E_MAX≤USE_CUNT) indicates that all of the entries are used. In addition, the second condition {(CF1−CNCL_CUNT)≤USE_CUNT} denotes that the issue of the speculative request is inhibited when the number of used entries is not less than the upper limit value UPL (=CF1−CNCL_CUNT), which is described in FIG. 13.

Firstly, in the case where the first set value CF1 is set to be equal to the total number of entries E_MAX, the speculative request is issued until the number of used entries reaches the total number of entries MAX in the case where the number of canceled entries is 0. Secondly, in the case where the first set value CF1 is set to be smaller than the total number of entries (CF1=E_MAX−α), α available entries are secured irrespective of the number of canceled entries, and can be used for the usual memory request. Thirdly, the upper limit value UPL is obtained by multiplying the number of canceled entries by a coefficient k and subtracting the value obtained by the multiplication from the first set value CF1 (the total number of entries E_MAX or E_MAX−α). For example, when the coefficient k=2 is set, the available entries of which the number is twice the number of canceled entries (or the available entries of which the number is twice the number of canceled entries+α) are secured, and can be used for the usual memory request. That is, the second condition is modified as follows:

(CF1−K*CNCL_CUNT)≤USE_CUNT

Further, the speculative request issue circuit 126 generates the speculative request valid signal SPC_REQ_VAL using the AND operation of the speculation possibility flag SPC_READY of the inputted request and the inverted value of the speculation busy signal MSC_SPC_BUSY. That is, in the case where the speculation possibility flag SPC_READY of the inputted request is "1" and the speculation busy signal MSC_SPC_BUSY is "0" (issue permission), the speculative request valid signal SPC_REQ_VAL is set to "1", and the speculative request is issued.

A logic circuit 129 is a logic circuit that generates the speculative request cancellation signal MSC_SPC_CANCEL. In the case where the speculative request valid signal SPC_REQ_VAL is "1" (the speculative request is already issued), and the tag determination indicates the tag hit or the abort is performed, the logic circuit 129 sets the speculative request cancellation signal MSC_SPC_CANCEL to "1".

FIG. 15 illustrates the process determination circuit 122 in the coherency control pipeline circuit 12 that generates the usual request valid signal MSC_REQ_VAL by. In the case where the tag hit/miss signal TAG_H/M is "0" indicative of the tag miss, and the abort signal ABORT is "0" indicating that the abort is not performed in the pipeline circuit, the logic circuit 112 in the process determination circuit sets the usual request valid signal MSC_REQ_VAL to "1".

However, when the speculative request is not issued (the entry is not obtained), and the tag miss is detected, in the case where each of TAG_H/M and ABORT is "0" (the tag miss is detected and no abort is performed) and the all entry use signal MSC_FULL indicating that the number of used entries is not less than the total number of entries is "0", the logic circuit 122 issues MSC_REQ_VAL=1. On the other hand, when the speculative request is issued (the entry is obtained) and the tag miss (the speculative request success) is detected, in the case where each of TAG_H/M and ABORT is "0", the logic circuit 122 issues MSC_REQ_VAL=1.

Figure 16:
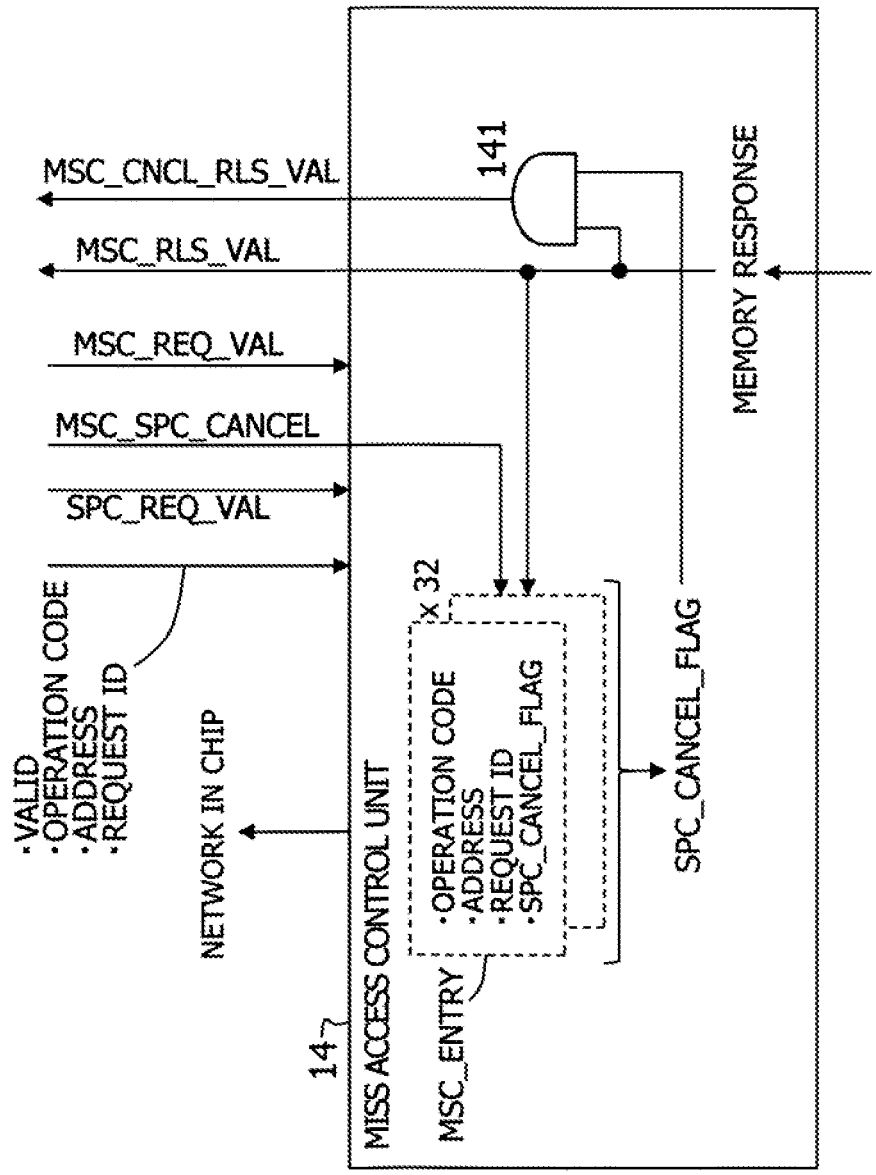
FIG. 16 is a view illustrating an example of the configuration of part of the miss access control unit.

FIG. 16 is a view illustrating an example of the configuration of part of the miss access control unit. The miss access control unit 14 has 32 entries MSC_ENTRY for registering the issued memory request. Further, in response to the speculative request cancellation signal MSC_SPC_CANCEL issued by the coherency control pipeline circuit 12, the miss access control unit 14 changes the speculation cancellation flag SPC_CANCEL_FLAG in the entry corresponding to the speculative request cancellation signal to "1". In addition, in response to the reception of the memory response to the memory request issued to the memory system, the miss access control unit 14 releases the entry corresponding to the memory response, and issues the entry release valid signal MSC_RLS_VAL to the coherency control pipeline circuit 12. Further, in response to the reception of the memory response, in the case where the speculation cancellation flag SPC_CANCEL_FLG of the corresponding entry is "1", the miss access control unit 14 issues the canceled entry release valid signal MSC_CNCL_RLS_VAL to the coherency control pipeline circuit 12.

Returning to FIG. 15, control of increment and decrement of the used entry number counter and the canceled entry number counter in the coherency control pipeline circuit will be described. First, the used entry number counter USE_CUNT is incremented when the speculative request valid signal SPC_REQ_VAL is set to "1" and the speculative request is issued, and is also incremented when the usual request valid signal MSC_REQ_VAL is set to "1" and the usual request is issued. The used entry number counter USE_CUNT is decremented when the entry release valid signal MSC_RLS_VAL is "1".

On the other hand, the canceled entry number counter CNCL_CUNT is incremented when the speculative request cancellation signal MSC_SPC_CANCEL is "1", and the canceled entry number counter CNCL_CUNT is decremented when the entry release valid signal MSC_RLS_VAL is "1" and the canceled entry release valid signal MSC_CNCL_RLS_VAL is "1".

Modification of First Embodiment

Figure 17:
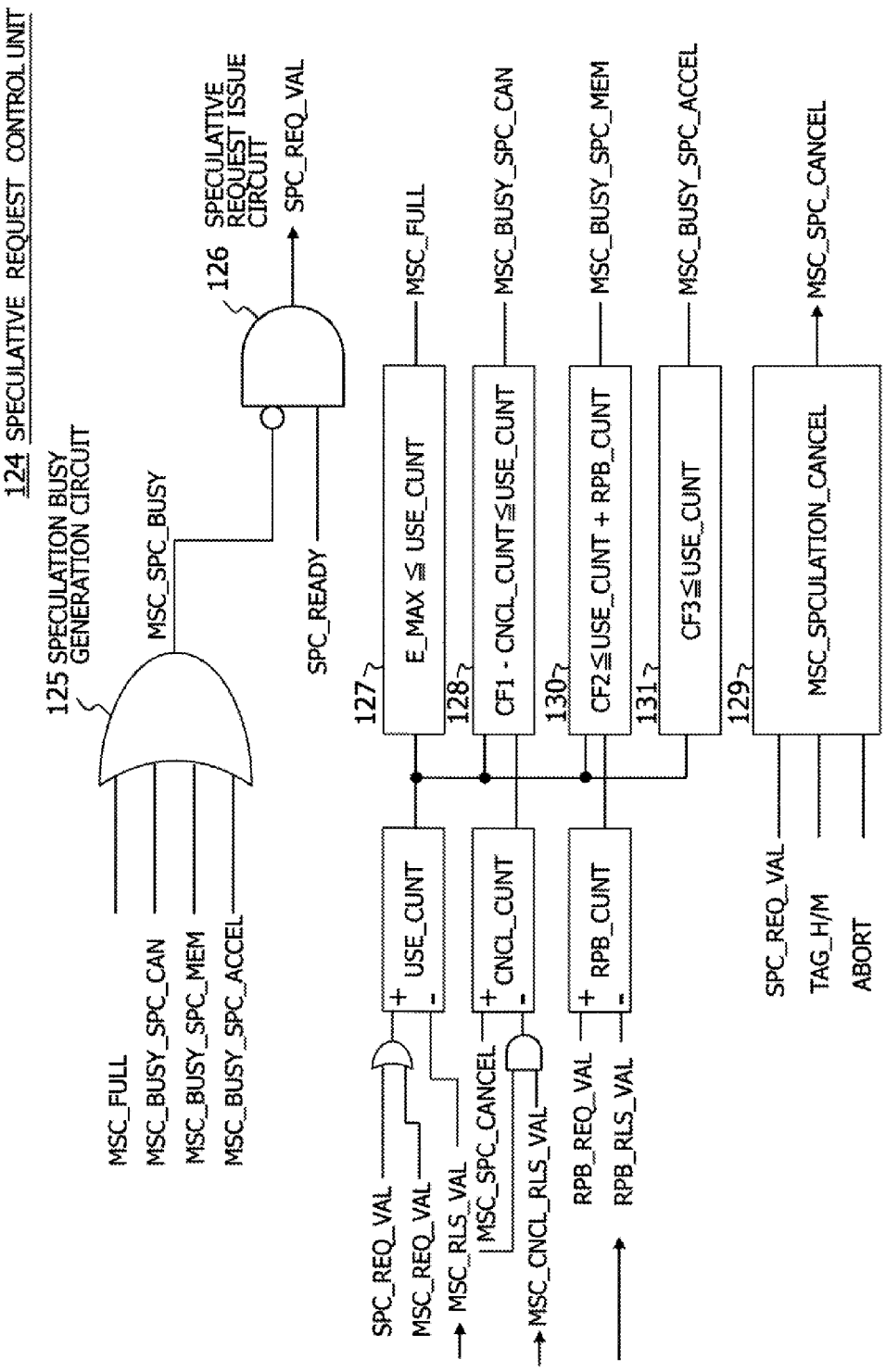
FIG. 17 is a view illustrating a modification of the configuration of the speculative request control unit in the first embodiment.

FIG. 17 is a view illustrating a modification of the configuration of the speculative request control unit in the first embodiment. When compared with the example of the configuration in FIG. 15, the speculation busy generation circuit 125 in FIG. 17 generates the speculation busy signal MSC_SPC_BUSY using the OR operation of a second speculation busy signal MSC_BUSY_SPC_MEM and a third speculation busy signal MSC_BUSY_SPC_ACCEL in addition to the all entry use signal MSC_FULL and the first speculation busy signal MSC_BUSY_SPC_CAN. Further, the speculative request control unit in FIG. 17 includes a replace buffer used entry number counter RPB_CUNT and logic circuits 130 and 131.

The replace buffer 16 illustrated in FIG. 14 is a circuit that performs the write back process from the LLC and, similarly to the miss access control unit, the replace buffer 16 has a plurality of entries RPB_ENTRY that receive the requests. When the replace buffer 16 receives a write back request RPB_REQ_VAL in the entry, the replace buffer 16 writes the data of the cache block in the memory MEM via the memory controller MC. Subsequently, when the replace buffer 16 receives a write back completion response from the memory controller, the replace buffer 16 transmits a release valid signal RPB_RLS_VAL to the coherency control pipeline circuit.

As illustrated in FIG. 17, the coherency control pipeline circuit manages the number of used entries in the replace buffer with the replace buffer used entry number counter RPB_CUNT. That is, the replace buffer used entry number counter RPB_CUNT is incremented when the write back request RPB_REQ_VAL is set to "1", and the replace buffer used entry number counter RPB_CUNT is decremented when the replay buffer release valid signal RPB_RLS_VAL is set to "1".

The second speculation busy signal MSC_BUSY_SPC_MEM in FIG. 17 is generated by the logic circuit 130. When the sum of the values of the used entry number counter USE_CUNT in the miss access control unit and the replace buffer used entry number counter RPB_CUNT is not less than a second set value CF2, the logic circuit 130 sets the second speculation busy signal MSC_BUSY_SPC_MEM to "1" The second set value CF2 is set to any value less than the total value of the total number of entries in the miss access control unit and the total number of entries in the replace buffer.

That is, each of the miss access control unit and the replace buffer that performs the write back of dirty data of the cache memory issues the memory request involving the access to the memory MEM. Therefore, when the number of memory accesses from both of them is not less than the second set value CF2, it means that the number of issued memory requests is increased, and the load of the memory is increased. When the speculative request is issued in this situation, the request to be possibly canceled executes the memory access, and an invalid memory access thereby uses a memory band, which reduces an effective throughput of the memory. In addition, when the load of the memory is high, the memory access remains in a request queue of the memory controller, and hence the effect of latency reduction by the speculative request is not expected.

To cope with this, the speculation busy generation circuit 125 sets the speculation busy signal MSC_SPC_BUSY to "1" (issue prohibition) according to the second speculation busy signal MSC_BUSY_SPC_MEM that is set to "1" in the case where CF2 USE_CUNT+RPB_CUNT is satisfied. With this, the speculative request control unit can inhibit the issue of the speculative request in a situation where too many memory accesses rush to the memory MEM.

The third speculation busy signal MSC_BUSY_SPC_ACCEL in FIG. 17 is generated by the logic circuit 131. When the value of the used entry number counter USE_CUNT in the miss access control unit is not less than a third set value CF3, the logic circuit 131 sets the third speculation busy signal MSC_BUSY_SPC_ACCEL to "1" The third set value CF3 is set to any value less than, e.g., the total number of entries in the miss access control unit.

That is, it is possible to accelerate the suppression of the issue of the speculative request by appropriately decreasing the third set value CF3, and it is possible to weaken the suppression of the issue of the speculative request by appropriately increasing the third set value CF3.

Second Embodiment

Figure 18:
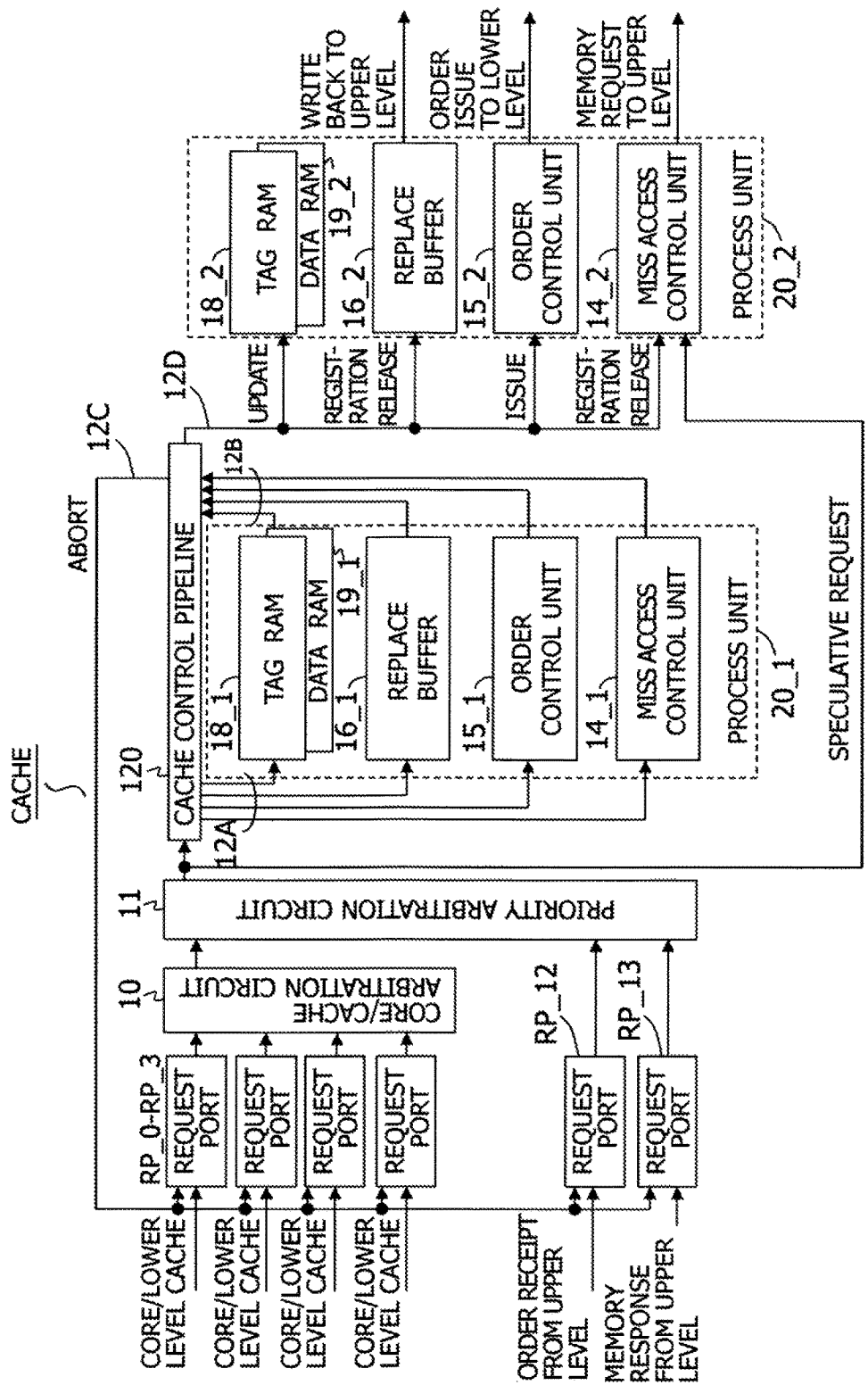
FIG. 18 is a view illustrating the configuration of a cache in a second embodiment.

FIG. 18 is a view illustrating the configuration of a cache in a second embodiment. A cache CACHE is, e.g., the LLC (last level cache) in FIG. 1, and may also be a cache at a level lower than the last level. As described above, the control of the present embodiment in which the speculative request is suppressed in accordance with the number of canceled entries can also be applied to the cache that issues the memory request, in addition to the coherency control unit of the first embodiment. Accordingly, in the second embodiment, the suppression control of the speculative request is applied to the cache.

The coherency control unit in the first embodiment in FIG. 3 is provided between a plurality of the LLCs and the memory layer, receives the memory access issued to the cache miss in the LLC, checks the tag copy of the LLC, issues the transfer order to the LLC that has the data when the cache hit is detected, and issues the memory request to the memory layer when the cache miss is detected. Therefore, in the configuration that has the control pipeline circuit that receives the requests from a plurality of lower levels and performs the control to the memory layer, and the process circuit unit that executes the process corresponding to the request, the coherency control unit in FIG. 3 speculatively issues the memory request to the miss access control unit.

The cache CACHE in FIG. 18 has the configuration similar to that of the coherency control unit in FIG. 3. However, unlike the coherency control unit, the cache has a tag memory 18 and a data memory 19 as cache memories. That is, the cache is different from the coherency control unit in that the cache has the original of the tag memory 18 and has the data memory 19 instead of the copy of the tag memory. In addition, the cache is different from the coherency control unit in that the cache has a request port RP_12 that receives the order from the upper level (the upper level cache or the coherency control unit), and a request port RP_13 that receives the memory response from the upper level.

On the other hand, similarly to the coherency control unit, the cache has the request ports RP, the core/cache arbitration circuit 10, the priority arbitration circuit 11, and a cache control pipeline circuit 120, and further has the process circuit unit 20 that includes the miss access control unit 14, the order control unit 15, and the replace buffer 16. Note that the miss access control unit issues the memory request to the upper level (the upper level cache and the coherency control unit). The miss access control unit of the coherency control unit in FIG. 3 issues the memory request to the upper level memory layer, and also issues the request to the remote (another CPU).

Therefore, similarly to the coherency control unit, in the cache in FIG. 18, the cache control pipeline circuit 120 refers to the tag to determine whether or not the tag hit is detected, and issues the memory request to the miss access control unit in the case where the tag miss is detected. Therefore, in the cache in FIG. 18, while the latency is expected to be improved by issuing the speculative request before the tag determination is performed, but the cache has a problem common to the coherency control unit that when the tag hit occurs, the number of canceled requests is increased.

To cope with this, in the cache in FIG. 18, the cache control pipeline circuit suppresses the issue of the speculative request in accordance with the number of cancellations in order to prevent a reduction in the use efficiency of the entry caused by the cancellation of the speculative request.

The configuration of the cache control pipeline circuit 120 includes the same speculative request control unit as those in FIGS. 4, 14, and 15.

Thus, according to the present embodiment, by increasingly suppressing the issue of the speculative request in accordance with the number of entries of which the speculative requests are canceled, it is possible to improve the use efficiency of the entry in the miss access control unit that receives the speculative request. The present embodiment is applied to the coherency control unit and the cache (the LCC or the cache at a level other than the last level).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   a processing core; and
   a first control circuit that performs control of a memory request to a memory issued by the processing core, wherein
   the first control circuit includes
      a miss access control unit that includes a plurality of input entries, registers the memory request to an input entry of the plurality of input entries to control a process related to the memory request and releases the input entry to which the memory request is registered when the process related to the memory request is completed, and
      a control pipeline circuit that performs a cache hit determination on whether or not an inputted memory request results in cache hit, and issues a normal memory request to the miss access control unit for the inputted memory request after the cache hit determination is completed in a case where the cache hit determination indicates cache miss and an input entry to which the normal memory request is able to be registered is available in the plurality of input entries, and the control pipeline circuit includes a speculative request control unit that:
   issues a speculative memory request to the miss access control unit for the inputted memory request before the cache hit determination is performed in a case where an input entry to which the speculative memory request is able to be registered is available in the plurality of input entries,
   cancels the issued speculative memory request in a case where the cache hit determination indicates the cache hit,
   decreases an upper limit of number of input entries, to which speculative memory requests are registered, in accordance with an increase in the number of input entries to which the canceled speculative memory requests are registered, and
   increases the upper limit of the number of input entries, to which the speculative memory requests are registered, in accordance with a decrease in the number of input entries to which the canceled speculative memory requests are registered.

2. The arithmetic processing device according to claim 1, wherein the speculative request control unit prohibits issuing the speculative memory request in a case where number of used input entries in the miss access control unit is not less than the upper limit, and allows issuing the speculative memory request in a case where number of used input entries in the miss access control unit is less than the upper limit.

3. The arithmetic processing device according to claim 2, wherein the upper limit is obtained by subtracting the number of input entries to which the canceled speculative memory requests are registered from a first set number.

4. The arithmetic processing device according to claim 3, wherein the first set number is a total number of the input entries.

5. The arithmetic processing device according to claim 3, wherein the first set number is a number less than a total number of the input entries.

6. The arithmetic processing device according to claim 2, wherein the upper limit is obtained by subtracting, from a first set number, a number obtained by multiplying the number of input entries to which the canceled speculative memory requests are registered by a coefficient.

7. The arithmetic processing device according to claim 3, wherein
   the first control circuit further includes a replace buffer that includes a plurality of input entries, and controls a replace process that writes back data of a cache line registered in a cache into the memory, and
   the speculative request control unit, further, prohibits issuing the speculative memory request in a case where a sum of the number of used input entries in the miss access control unit and the number of used input entries in the replace buffer is not less than a second set number.

8. The arithmetic processing device according to claim 6, wherein
   the first control circuit further includes a replace buffer that includes a plurality of input entries, and controls a replace process that writes back data of a cache line registered in a cache into the memory, and
   the speculative request control unit, further, prohibits issuing the speculative memory request in a case where a sum of the number of used input entries in the miss access control unit and the number of used input entries in the replace buffer is not less than a second set number.

9. The arithmetic processing device according to claim 3, wherein the speculative request control unit, further, prohibits issuing the speculative memory request in a case where the number of used input entries in the miss access control unit is not less than a third set number less than a total number of input entries in the miss access control unit.

10. The arithmetic processing device according to claim 6, wherein the speculative request control unit, further, prohibits issuing the speculative memory request in a case where the number of used input entries in the miss access control unit is not less than a third set number less than a total number of input entries in the miss access control unit.

11. The arithmetic processing device according to claim 3, wherein the speculative request control unit, further, prohibits issuing the speculative memory request in a case where the number of used input entries in the miss access control unit is not less than a total number of input entries in the miss access control unit.

12. The arithmetic processing device according to claim 6, wherein the speculative request control unit, further, prohibits issuing the speculative memory request in a case where the number of used input entries in the miss access control unit is not less than a total number of input entries in the miss access control unit.

13. The arithmetic processing device according to claim 3, wherein the control pipeline circuit prohibits issuing the normal memory request in a case where the number of used input entries in the miss access control unit is not less than a total number of input entries in the miss access control unit.

14. The arithmetic processing device according to claim 6, wherein the control pipeline circuit prohibits issuing the normal memory request in a case where the number of used input entries in the miss access control unit is not less than a total number of input entries in the miss access control unit.

15. The arithmetic processing device according to claim 1, further comprising:
a cache that processes the memory request issued by the processing core; and
a coherency control unit that controls coherency of the cache, wherein
the coherency control unit includes the first control circuit, and performs the cache hit determination by referring to a copy of a tag of the cache.

16. The arithmetic processing device according to claim 1, further comprising:
a cache that processes the memory request issued by the processing core, wherein the cache includes the first control circuit, and performs the cache hit determination by referring to a tag of the cache.

17. A method of controlling an arithmetic processing device, the method comprising:
the arithmetic processing device including a processing core; and a first control circuit that performs control of a memory request to a memory issued by the processing core, wherein the first control circuit includes a miss access control unit that includes a plurality of input entries, registers the memory request to an input entry of the plurality of input entries to control a process related to the memory request and releases the input entry to which the memory request is registered when the process related to the memory request is completed, and a control pipeline circuit that issues a memory request that is input to the miss access control unit,
performing, by the control pipeline circuit, a cache hit determination on whether or not an inputted memory request results in cache hit;
issuing, by the control pipeline circuit, a normal memory request to the miss access control unit for the inputted memory request after the cache hit determination is completed in a case where the cache hit determination indicates cache miss and an input entry to which the normal memory request is able to be registered is available in the plurality of input entries;
issuing, by the control pipeline circuit, a speculative memory request to the miss access control unit for the inputted memory request before the cache hit determination is performed in a case where an input entry to which the speculative memory request is able to be registered is available in the plurality of input entries;
canceling, by the control pipeline circuit, the issued speculative memory request in a case where the cache hit determination indicates the cache hit;
decreasing, by the control pipeline circuit, an upper limit of number of input entries, to which speculative memory requests are registered, in accordance with an increase in the number of input entries to which the canceled speculative memory requests are registered, and
increasing, by the control pipeline circuit, the upper limit of the number of input entries, to which the speculative memory requests are registered, in accordance with a decrease in the number of input entries to which the canceled speculative memory requests are registered.

* * * * *